United States Patent
Tong et al.

(10) Patent No.: US 10,547,425 B2
(45) Date of Patent: *Jan. 28, 2020

(54) METHOD AND COMMUNICATION APPARATUS FOR MAPPING REFERENCE SIGNAL IN WIRELESS COMMUNICATION SYSTEM

(71) Applicant: Sun Patent Trust, New York, NY (US)

(72) Inventors: Hui Tong, Beijing (CN); Ming Xu, Beijing (CN); Masayuki Hoshino, Kanagawa (JP); Daichi Imamura, Beijing (CN)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,536

(22) Filed: Apr. 6, 2018

(65) Prior Publication Data

US 2018/0227100 A1    Aug. 9, 2018

Related U.S. Application Data

(63) Continuation of application No. 15/363,732, filed on Nov. 29, 2016, now Pat. No. 9,973,313, which is a (Continued)

(30) Foreign Application Priority Data

Apr. 27, 2009  (CN) .......................... 2009 1 0136073

(51) Int. Cl.
*H04B 15/00*    (2006.01)
*H04L 5/00*    (2006.01)
(Continued)

(52) U.S. Cl.
CPC ......... *H04L 5/0048* (2013.01); *H04B 7/0617* (2013.01); *H04B 7/0626* (2013.01);
(Continued)

(58) Field of Classification Search
CPC .... H04L 5/0055; H04L 5/0057; H04L 5/0073
See application file for complete search history.

(56) References Cited

U.S. PATENT DOCUMENTS 7,049,988 B1    5/2006 Duewer et al.
7,751,510 B2    7/2010 Budianu et al.
(Continued)

FOREIGN PATENT DOCUMENTS

CN    101123599 A    2/2008
CN    101174851 A    5/2008
(Continued)

OTHER PUBLICATIONS

Indian Examination Report, dated Sep. 10, 2018, for the related Indian Patent Application No. 2284/MUMNP/2011, 6 pages.
(Continued)

*Primary Examiner* — Shukri Taha
(74) *Attorney, Agent, or Firm* — Seed IP Law Group LLP

(57) ABSTRACT

A method and a system of setting up a reference signal in a radio communication system are disclosed. The radio communication system includes a serving cell and a neighboring cell, and a mobile terminal of the serving cell uses the same temporal frequency resource to receive a serving resource block from the serving cell and an interference resource block from the neighboring cell. The method includes setting up a user-specific reference signal in the interference resource block and puncturing at the same temporal frequency position as the temporal frequency position at which the user-specific reference signal is set up on the interference resource block of the serving resource block to prevent any
(Continued)

signal from being transmitted at the punctured temporal frequency position. When the method and the system are used and the interference power between cells is measured, it is possible to effectively reduce feedback overhead in a coordinated beamforming.

18 Claims, 15 Drawing Sheets

Related U.S. Application Data continuation of application No. 14/338,246, filed on Jul. 22, 2014, now Pat. No. 9,544,109, which is a continuation of application No. 13/266,441, filed as application No. PCT/CN2010/071663 on Apr. 9, 2010, now Pat. No. 8,825,095.

(51) Int. Cl.
*H04W 16/14* (2009.01)
*H04W 72/04* (2009.01)
*H04B 7/06* (2006.01)
*H04W 72/08* (2009.01)

(52) U.S. Cl.
CPC ......... *H04B 7/0639* (2013.01); *H04L 5/0055* (2013.01); *H04L 5/0057* (2013.01); *H04W 16/14* (2013.01); *H04W 72/04* (2013.01); *H04W 72/046* (2013.01); *H04W 72/0473* (2013.01); *H04W 72/082* (2013.01); *H04W 72/085* (2013.01); *H04W 72/0453* (2013.01)

(56) References Cited

U.S. PATENT DOCUMENTS

| | | | |
|---|---|---|---|
| 8,280,370 | B2 | 10/2012 | Wu et al. |
| 2007/0025460 | A1 | 2/2007 | Budianu et al. |
| 2008/0013599 | A1 | 1/2008 | Malladi |
| 2009/0186609 | A1 | 7/2009 | Wu et al. |
| 2010/0103828 | A1 | 4/2010 | Kuroda et al. |
| 2010/0202400 | A1 | 8/2010 | Richardson et al. |
| 2011/0003567 | A1* | 1/2011 | Lee ............... H04W 52/16 455/127.1 |
| 2012/0008587 | A1 | 1/2012 | Lee et al. |
| 2012/0295654 | A1 | 11/2012 | Sridhara et al. |
| 2014/0335891 | A1 | 11/2014 | Zhang et al. |
| 2015/0063138 | A1 | 3/2015 | Aldana |
| 2015/0215821 | A1 | 7/2015 | Zhang et al. |

FOREIGN PATENT DOCUMENTS

| | | |
|---|---|---|
| CN | 101267664 A | 9/2008 |
| CN | 101273595 A | 9/2008 |
| CN | 101394263 A | 3/2009 |
| JP | 2007-013406 A | 1/2007 |
| JP | 2007-525044 A | 8/2007 |
| WO | 02/39623 A1 | 5/2002 |
| WO | 2004/077685 A2 | 9/2004 |

OTHER PUBLICATIONS

Alcatel-Lucent, "Estimation of extended PMI feedback signalling required for user intra-cell and inter-cell coordination," R1-091252, 3GPP TSG RAN WG1 #56bis Meeting, Seoul, Korea, Mar. 23-27, 2009, pp. 1-5.
English Translation of Chinese Search Report dated Oct. 31, 2013, for corresponding CN Patent Application No. 2010800187802, 3 pages.
English Translation of Russian Office Action dated Feb. 21, 2014, for corresponding RU Patent Application 2011143358/07(065007), 3 pages.
English translation of Chinese Search Report, dated Apr. 12, 2017, for corresponding Chinese Application No. 201410534321X, 2 pages.
Fujitsu, "An Efficient Reference Signal Design in LTE Advanced," R1-090949, Agenda Item: 12.2, 3GPP TSG-RAN1 #56, Athens, Greece, Feb. 9-13, 2009, 13 pages.
Fujitsu, "DL Reference Signal Design for 8×8 MIMO in LTE-Advanced," R1-090706, 3GPP TSG-RAN1 #56, Agenda Item: 12.4, Athens, Greece, Feb. 9-13, 2009, 12 pages.
International Search Report for corresponding International Application No. PCT/CN2010/071663, dated Jul. 15, 2010, 2 pages.
NTT Docomo, "DL RS Design for LTE-Advanced," R1-091483, Agenda Item: 15.1, 3GPP TSG RAN WG1 Meeting #56bis, Seoul, Korea, Mar. 23-27, 2009, 6 pages.
Qualcomm Europe, "Further Considerations and Link Simulations on Reference Signals in LTE-A," R1-090875, Agenda Item: 12.4, 3GPP TSG-RAN WG1 #56, Athens, Greece, Feb. 9-13, 2009, 6 pages.
Qualcomm Europe, "RS Structure in Support of Higher-order MIMO," R1-091450, Agenda Item: 15.1, 3GPP TSG-RAN WG1 #56bis, Seoul, South Korea, Mar. 23-27, 2009, 10 pages.
Samsung, "RE puncturing pattern for RS boosting," R1-081741, 3GPP TSG-RAN Working Group 1 #53, Agenda Item: 7.1.3, Kansas City, U.S.A, May 5-9, 2008, 4 pages.

* cited by examiner

METHOD AND COMMUNICATION APPARATUS FOR MAPPING REFERENCE SIGNAL IN WIRELESS COMMUNICATION SYSTEM

TECHNICAL FIELD

The present disclosure relates to a multi-antenna signal transmission technology in a communication field.

BACKGROUND ART

In today's cellular network radio communication system (for example, LTE and WiMAX), user equipment (UE) receives not only a signal of a serving base station but also interference between neighboring base stations (i.e., inter-cell interference). Inter-cell interference becomes comparatively stronger and becomes a major factor to limit system throughput when the user is at the cell edge.

Multiple base station cooperation is a type of technology for effectively reducing interference between cells. Coordinated beamforming is a type of method that can realize multiple base station cooperation. When a plurality of antennas are placed at a base station, the antenna directivity can be changed according to a precoding vector of an antenna array, a signal of a serving cell can be increased, and at the same time, the interference from the neighboring cells can be reduced.

FIG. 1 is a model of a coordinated beamforming between each communication cell in a communication system. As shown in FIG. 1, the system includes three (but not limited to three) base stations (cells) eNB 1, eNB 2, and eNB 3 in which, base station eNB 1 is the serving base station of the user equipment (UE) located at the border of the three cells. UE receives a signal from its own serving base station eNB 1 but at the same time receives interference from the neighboring cells (base stations eNB 2 and eNB 3). User equipment UE needs to measure the serving cell channels and the neighboring cell channels and then give a periodic feedback to serving base station eNB 1 about channel information on these channels. As a result, serving base station eNB 1 designs a precoding vector of the beam forming and strengthens the signal of serving cell eNB 1, and notifies the channel information on the corresponding channel through an inter-base station communication to the base station of the corresponding cell; and reduces the interference to the serving cell eNB 1 by adjusting the precoding vector of its own self beam forming in these base stations.

The channel information herein may be PMI (Precoding Matrix Index) of each channel or CSI (Channel Status Information), and the like.

FIG. 2 is a schematic diagram illustrating a channel information report to base station eNB 1 of the serving cell of user equipment UE. As shown in FIG. 2, along with the passage of time, user equipment UE reports the all channel information of the three cells, such as precoding matrix index PMI-1 of serving cell eNB 1, and precoding matrix index PMI-2 and precoding matrix index PMI-3 of two neighboring cells eNB 2 and eNB 3, to serving base station eNB 1 of the serving cell once per cycle T.

In the above coordinated beamforming, user equipment UE needs to give not only a feedback on the channel information of serving cell eNB 1 but also a feedback on the channel information of the neighboring cells, and thus, as compared to the conventional system without the cooperative transmission between cells, the coordinated beamforming requires a larger feedback overhead. Therefore, a challenge of the coordinated beamforming is to effectively reduce feedback overhead.

SUMMARY OF INVENTION

According to one aspect of the present disclosure, there is provided a method of setting up a reference signal in a radio communication system. The radio communication system includes a serving cell and a neighboring cell. A mobile terminal of the serving cell uses the same temporal frequency resource so as to receive a serving resource block from the serving cell and receive an interference resource block from the neighboring cell. The method according to the present disclosure includes a step of setting up a user-specific reference signal in the interference resource block, and a step in which puncturing is performed at the same temporal frequency position as the temporal frequency position at which the user-specific reference signal is set up on the interference resource block in the serving resource block so as to prevent any signal from being transmitted at the punctured temporal frequency position.

According to another aspect of the present disclosure, there is provided a radio communication system. The radio communication system includes a serving cell and a neighboring cell. A mobile terminal of the serving cell uses the same temporal frequency resource so as to receive a serving resource block from the serving cell and receive an interference resource block from the neighboring cell. The radio communication system includes an set up section that set ups a user-specific reference signal in the interference resource block, and a puncturing section that performs puncturing at the same temporal frequency position as the temporal frequency position at which the user-specific reference signal is set up on the interference resource block in the serving resource block so as to prevent any signal from being transmitted at the punctured temporal frequency position.

When a method and a system of setting up a reference signal provided in the present disclosure is used, and at the same time, when an interference power between cells is measured by using the same, it is possible to effectively reduce feedback overhead in a coordinated beamforming.

BRIEF DESCRIPTION OF DRAWINGS

These aspects and/or other aspects and advantages of the present disclosure become clearer and easier to understand from the detailed description given below which is a combination of the drawings and embodiments of the present disclosure. In the drawings.

DESCRIPTION OF EMBODIMENTS

Specific embodiments of the present disclosure are described in detail in combination with the drawings. The detailed descriptions of some of the relating conventional technologies are not provided if the detailed descriptions thereof may make the essential points of the present disclosure ambiguous. Elements or means that execute the same functions are assigned with same signs in each embodiment.

The present disclosure proposes the measurement of an interference power between cells according to a method of setting up a user-specific reference signal in a downlink of a radio communication system. In a specific method, a neighboring cell (interference cell) set ups a user-specific reference signal on a resource block (interference resource block) to be transmitted, and a serving cell (interfered cell) performs puncturing at the same temporal frequency position at the temporal frequency positions at which the user-specific reference signal exist, on a resource block (serving resource block) transmitted to its own user equipment (for example, a mobile terminal). This disclosure further proposes a method in which a "Power sensing reference signal" is set up and the power sensing reference signal is used as the user-specific reference signal. Thus, even if an interfered user is not aware of the number of interference signal layers, it is possible to accurately sense a total interference power. The beampattern of this power sensing reference signal may be equivalent or almost equivalent to a sum of beampattern of the interference signal in each layer. When there is interference from signals of a plurality of users, this power sensing reference signal can be used for measurement of the interference power of a plurality of users.

Figure 1:
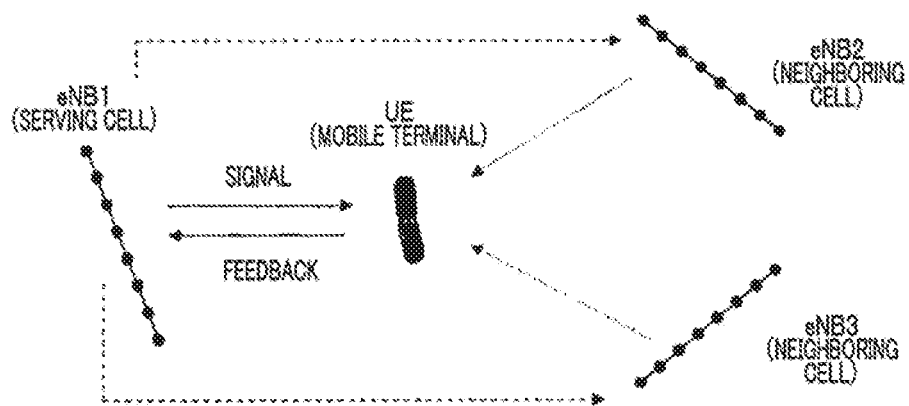
FIG. 1 shows a model of a coordinated beamforming between each communication cell in a communication system.
Figure 2:
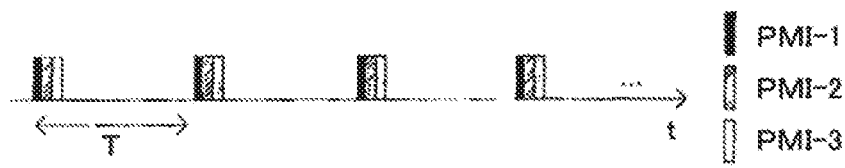
FIG. 2 is a schematic diagram illustrating a channel information report to a base station of a serving cell of a user equipment.
Figure 3A:
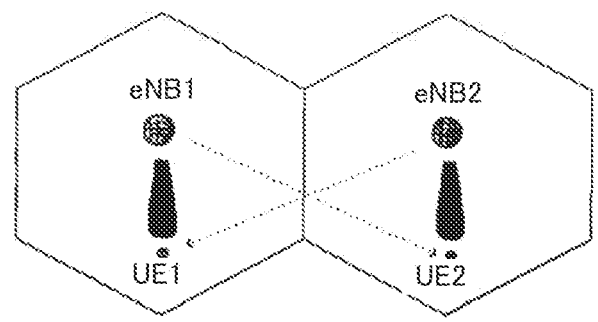
FIG. 3A and FIG. 3B are schematic diagrams illustrating inter-cell interference.
Figure 3B:
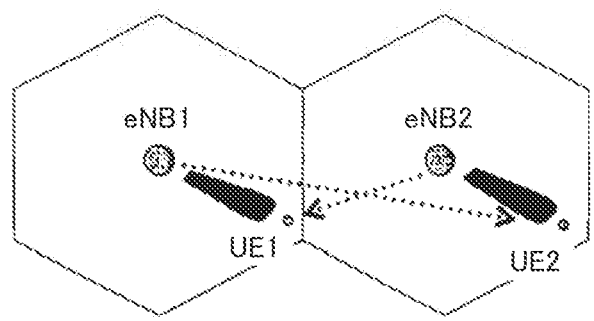

FIG. 3A and FIG. 3B are schematic diagrams illustrating inter-cell interference. As shown in FIG. 3A, when cell base station eNB 1 communicates with mobile terminal UE 1, the power of an antenna beam is focused mainly in the direction of UE 1, and similarly, when cell base station eNB 2 communicates with mobile terminal UE 2, the power of an antenna beam is focused mainly in the direction of UE 2. However, when UE 1 and UE 2 receive signals from their own respective serving base stations eNB 1 and eNB 2, these UEs receive interference (illustrated with a dotted line in FIG. 3A) from the neighboring cells eNB 1 and eNB 2. However, in some cases, as shown in FIG. 3B, the antenna beam direction of cell base station eNB 2 is remote from mobile terminal UE 1, and as such, when UE 1 communicates with serving base station eNB 1, the interference received from neighboring base station eNB 2 becomes comparatively small, as a result of which the interference for the communication also is comparatively small. On the other hand, in a situation depicted in FIG. 3A, the antenna beam direction of cell base station eNB 2 is more closer to mobile terminal UE 1, and because of this, when UE 1 communicates with serving base station eNB 1, the interference received from neighboring base station eNB 2 becomes comparatively large, as a result of which the interference for the communication may also become comparatively large.

The present disclosure proposes in such a situation a solution that can reduce feedback overhead, i.e., proposes a solution in which, a mobile terminal gives a feedback on channel information of neighboring cells to the serving base station only when there is definitely inter-cell interference and considers that it is not necessary to give the feedback on the channel information of this neighboring cells when there is no inter-cell interference (signal). Such a feedback method can be called as an adaptive feedback method rather than a periodic feedback method.

Figure 4A:
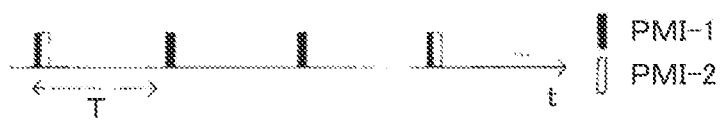
FIG. 4A and FIG. 4B are schematic diagrams illustrating an adaptive feedback method according to an embodiment of the present disclosure.
Figure 4B:
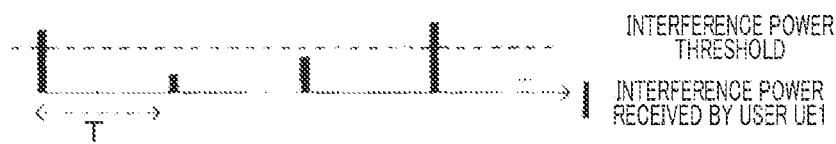

FIG. 4A and FIG. 4B are schematic diagrams illustrating the adaptive feedback method according to the embodiment of the present disclosure. A vertical block in FIG. 4B represents interference power, that mobile terminal UE 1 receives, from the neighboring cell eNB 2. If the value of interference power from the neighboring cells eNB 2, measured in UE 1, exceeds a predetermined threshold value (the threshold value can be set up by a person skilled in the art according to the actual demand of the system), then UE 1 reports the interference power to serving cell eNB 1, and if the value of the received interference power does not exceed the predetermined threshold value, then mobile terminal UE 1 does not report the interference power to serving base station eNB 1. That is, it is necessary to determine whether to report according to the size of the interference power of the neighboring cells.

In the above adaptive feedback method, mobile terminal UE 1 is required to effectively measure the interference power of the neighboring cells; however, the conventional inter-cell channel estimation methods are all based on CSI- RS (CSI reference signal). CSI-RS is a cell-specific signal, and this means that the CSI-RS can be transmitted normally even when there is no interference between the cells (i.e., even when the real interference signal is not transmitted). Therefore, the interference power of the neighboring cells cannot be exactly reflected in the measurements based on CSI-RS.

The embodiments of the present disclosure propose a solution that measures the interference power of the neighboring cells. This solution is performed based not on a cell-specific reference signal but on a user-specific reference signal. In this way, it is possible to effectively understand the interference power of the neighboring cells. In this case, the user-specific reference signal is a precoded reference signal transmitted together with data transmitted to a mobile terminal, and includes precoding vector information of an antenna of the cell. Specifically, when a communication base station of an interfered cell, for example, eNB 1, performs puncturing on data on a temporal frequency position (specific time and frequency) corresponding to the user-specific reference signal of the neighboring cells eNB 2 and/or eNB 3, in other words, does not transmit any data on the temporal frequency position, the reception power obtained by measuring on this temporal frequency position, is the interference power of the neighboring cells.

The embodiments of the present disclosure are specifically described in combination with the drawings below.

Figure 5A:
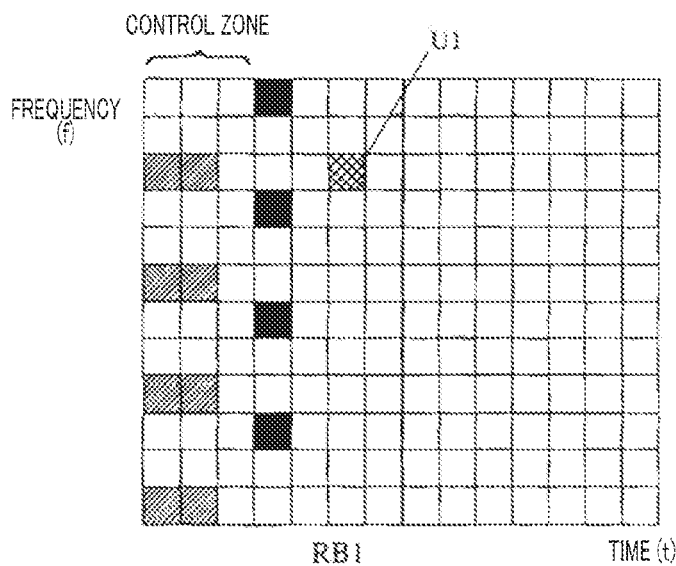
FIG. 5A and FIG. 5B are diagrams illustrating an set up a user-specific reference signal on an interference resource block according to the embodiment of the present disclosure.
Figure 5B:
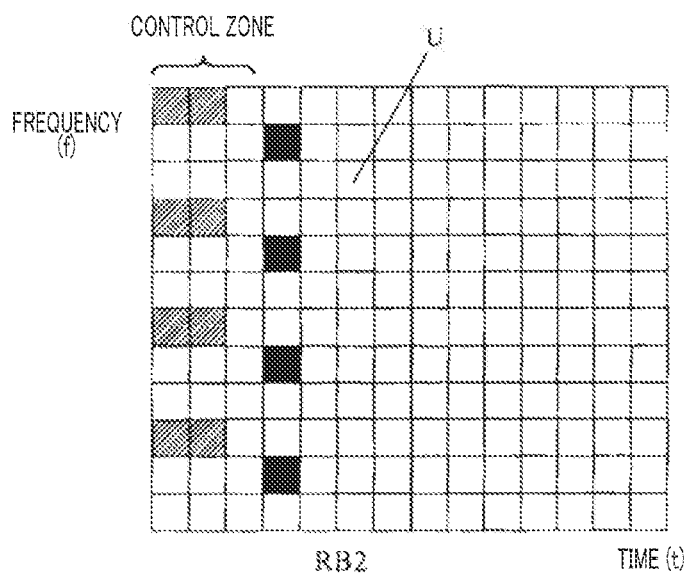

FIG. 5A and FIG. 5B are diagrams illustrating the user-specific reference signal set up on the interference resource block, according to the embodiment of the present disclosure. Under the environment shown in FIG. 3A and FIG. 3B, mobile terminal UE 1 can receive the serving signal from its serving base station eNB 1, and at the same time, receive the interference signal from base station eNB 2 (interference source) of the neighboring cells. FIG. 5A represents resource block (referred to as "serving resource block" below) RB 1 of a signal that mobile terminal UE 1 receives from serving cell eNB 1, where a horizontal axis denotes time t, a vertical axis denotes frequency, and respective squares each denote a resource element. All the information signal resources that mobile terminal UE 1 receives from serving base station eNB 1 are configured by a plurality of serving resource blocks RB 1 that are continuous in time and frequency. Each serving resource block RB 1 is an information signal transmitted over one time range (for example, from time t1 to time t2) and one frequency range (for example, from frequency f1 to frequency f2). The resource elements in the first three rows of serving resource block RB 1 are control zones that are responsible for the transmission of control data, and the resource elements represented by a slanting line specifically represent Rel-8 RS (Rel-8 reference signal) of the LTE system. A resource element shown without any color is used to transmit a data signal. A dark colored resource element is a cell-specific CSI-RS signal. The quantity of CSI-RS signals does not limit the present disclosure, and any quantity of CSI-RS signals may be set up according to a system requirement.

FIG. 5B shows resource block (referred to as "interference resource block" below) RB 2 of the interference signal that mobile terminal UE 1 receives from neighboring cells eNB 2. Similarly, the horizontal axis of interference resource block RB 2 denotes time t, a vertical axis denotes frequency, and respective squares denote a resource element. The resources of all the interference signals that mobile terminal UE 1 receives from base station eNB 2 of the neighboring cells are configured by a plurality of interference resource blocks RB 2 continuing in time and frequency. Each interference resource block RB 2 is a signal transmitted over one time range (for example, from time t1 to time t2) and one frequency range (for example, from frequency f1 to frequency f2). The resource elements in the first three rows of interference resource block RB 2 are control zones that are responsible for the transmission of the control data, and the resource element represented by a slanting line can specifically show Rel-8 RS (Rel-8 reference signal) of the LTE system. A resource element shown without any color is used to transmit a data signal. A dark colored resource element is a cell-specific CSI-RS signal. The quantity of CSI-RS signals does not limit this disclosure and any quantity of CSI-RS signals may be set up according to the system requirement.

That is, serving resource block RB 1 and interference resource block RB 2 are formed with a plurality of resource elements, respectively, and each resource element occupies a different temporal frequency position (range of a specific time and frequency) and is used in the transmission of a control signal, a channel status information reference signal, and/or a data signal. Since serving resource block RB 1 and interference resource block RB 2 are located on the same temporal frequency resource, these can be considered as overlapping.

According to the embodiment of the present disclosure, in a system environment shown in FIG. 3A and FIG. 3B, the radio communication system includes serving cell (base station) eNB 1 and neighboring cell (base station) eNB 2, and when mobile terminal UE 1 of serving cell eNB 1 uses the same temporal frequency resource, i.e., receives serving resource block RB 1 from serving cell eNB 1 as well as receives interference resource block RB 2 from neighboring cell eNB 2 within the same time and frequency range, each cell eNB 1 and/or eNB 2 in the radio communication system set ups the reference signal in the downlink transmitting to the corresponding mobile terminal (for example, UE 1 and/or UE 2) as follows: neighboring cell eNB 2 set ups a user-specific reference signal in interference resource block RB 2 and serving cell eNB 1 performs puncturing at the same temporal frequency position as the temporal frequency position at which the user-specific reference signal is set up so as to prevent any signal from being transmitted at the punctured temporal frequency position on the interference resource block RB 2, in the serving resource block RB 1.

Specifically, it is possible to include one or a plurality of user-specific reference signals (only one signal is shown) in interference resource block RB 2 shown in FIG. 5B, and in this case, the signal is represented by an alphabet U. This user-specific reference signal U, which undergoes the precoding of base station eNB 2 of the neighboring cell, is transmitted together with interference resource block RB 2, and includes precoding vector information by which the base station eNB 2 of the neighboring cell communicates with the mobile terminal UE 2. In such a situation, serving base station eNB 1 of mobile terminal UE 1 can obtain a position in interference resource block RB 2 of the user-specific reference signal U by cooperating (according to a method well known by a person skilled in the art) with base station eNB 2 of the neighboring cell, and performs puncturing at the same temporal frequency position in the serving resource block RB 1 transmitted from the eNB 1 itself, as shown in the resource element (represented by U1) shown with a shaded line in serving resource block RB 1 in FIG. 5A. That is, any signal is prevented from being transmitted in resource element U1 of serving resource block RB 1.

In this way, mobile terminal UE 1 can measure the power of the user-specific reference signal at the punctured temporal frequency position, as the interference power that is received from neighboring cell eNB 2. Specifically, when mobile terminal UE 1 receives serving resource block RB 1 from serving base station eNB 1 and receives interference resource block RB 2 from base station eNB 2 of the neighboring cell with the same temporal frequency resource (within the range of the same time and frequency), the mobile terminal UE 1 can measure the total power of the signal at the positions (same temporal frequency position) of the U and U1. Since resource element U1 does not transmit any signal, the total power of the measured signal is power of the signal transmitted in U and can indicate the interference power from neighboring cell eNB 2. This allows mobile terminal UE 1 to obtain the interference power from neighboring cell eNB 2. Also, if the interference power from the measured neighboring cell eNB 2 exceeds a predetermined threshold value, mobile terminal UE 1 reports the interference power to serving cell eNB 1.

Figure 6A:
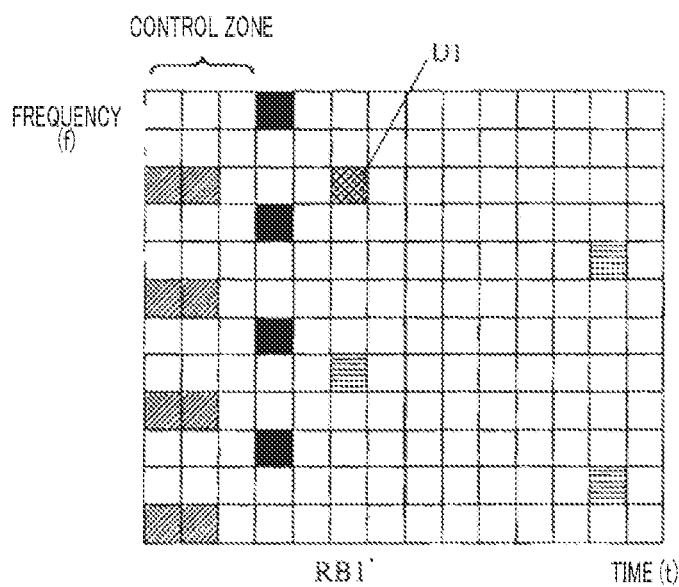
FIG. 6A and FIG. 6B are diagrams illustrating an set up of a user-specific reference signal, as a demodulation reference signal, according to the embodiment of the present disclosure.
Figure 6B:
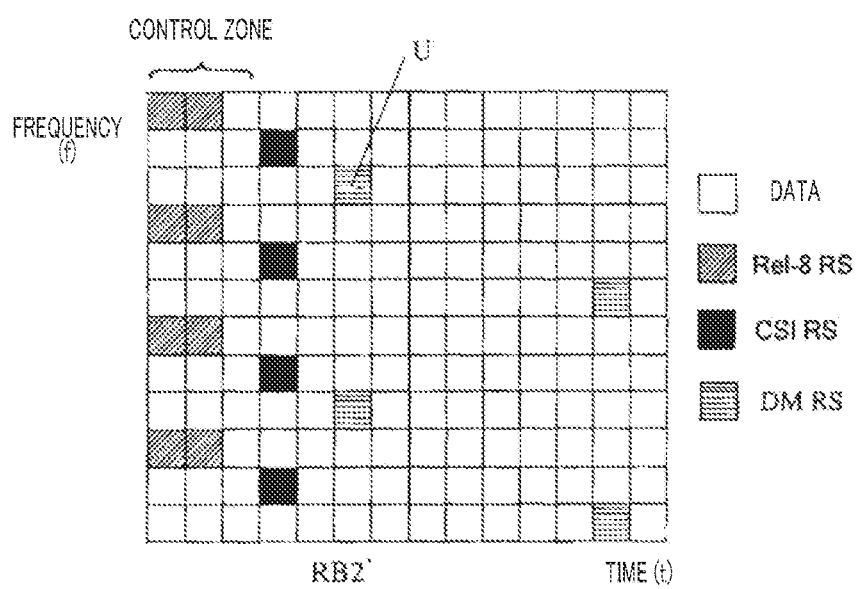

FIG. 6A and FIG. 6B are diagrams showing set up of the user-specific reference signal, as a demodulation reference signal, according to the embodiment of the present disclosure. For example, in the LTA-A radio communication system, a demodulation reference signal (DM-RS) is further included in the resource block transmitted by the cell base station, and this demodulation reference signal itself is a user-specific reference signal. That is, the demodulation reference signal is a reference signal that has undergone precoding, transmitted along with data that serving base station eNB 1 and/or eNB 2 transmits to mobile terminal UE 1 and/or UE 2, includes precoding vector information of the antenna of the transmission cell, and is a reference signal by which mobile terminal UE 1 and/or UE 2 demodulates the data transmitted by serving base station eNB 1 and/or eNB 2. Therefore, in FIG. 6A and FIG. 6B, the demodulation reference signal is an actual example of the user-specific reference signals, i.e., it is possible to set up the user-specific reference signal as the demodulation reference signal in the interference resource block.

FIG. 6A and FIG. 6B are basically the same as FIG. 5A and FIG. 5B, so the same parts in FIG. 6A and FIG. 6B as those in FIG. 5A and FIG. 5B are not described again; however, the demodulation reference signals are again shown in the serving resource block RB 1' of FIG. 6A and interference resource block RB 2' in FIG. 6B, respectively, and are shown by resource elements represented by a horizontal line. In this case, the four demodulation reference signals are shown; however, the quantity of the demodulation reference signals does not limit the present disclosure and any quantity of demodulation reference signals may be set up according to a system requirement. It can be seen from FIG. 6A and FIG. 6B that the position of the demodulation reference signal in serving resource block RB 1' and the position of the demodulation reference signal in interference resource block RB 2' do not overlap on the temporal frequency resource. In this case, serving resource block RB 1' and interference resource block RB 2' are formed with a plurality of resource elements, respectively, each resource element occupies a different temporal frequency position (range of a specific time and frequency), and are used to transmit a control signal, a channel status information reference signal, and a demodulation reference signals and/or data signals, respectively.

In such a situation, serving base station eNB 1 of mobile terminal UE 1 can obtain the positions of the demodulation reference signals in the resource block RB 2' (only one of the demodulation reference signals can be selected, and although the signal is represented by U, one or a plurality of signals may be possible) by cooperating with base station eNB 2 of the neighboring cell, and as shown in the resource element (represented by U1) represented by a shaded line in serving resource block RB 1' of FIG. 6A, performs puncturing at the temporal frequency position corresponding to serving resource block RB 1' transmitted by eNB 1 itself. That is, any signal is prevented from being transmitted in resource element U1 of serving resource block RB 1'.

When mobile terminal UE 1 receives serving resource block RB 1' from serving base station eNB 1 and receives interference resource block RB 2' from base station eNB 2 of the neighboring cell by the same temporal frequency resource (within the range of the same time and frequency), mobile terminal UE 1 can measure the total power of signals at the position (the same position) of U and U1. Since resource element U1 does not transmit any signals, the total power of the measured signal is the power of the demodulation reference signal transmitted in U. Since a beampattern of the demodulation reference signal of the transmission cell is identical to a beampattern of a whole of each transmission signal of the transmission cell, the power can indicate the interference power from neighboring cell eNB 2. Thus, mobile terminal UE 1 can obtain the interference power from neighboring cell eNB 2. Also, if the measured interference power from neighboring cell eNB 2 exceeds a predetermined threshold value, mobile terminal UE 1 reports the interference power to serving cell eNB 1.

Figure 7A:
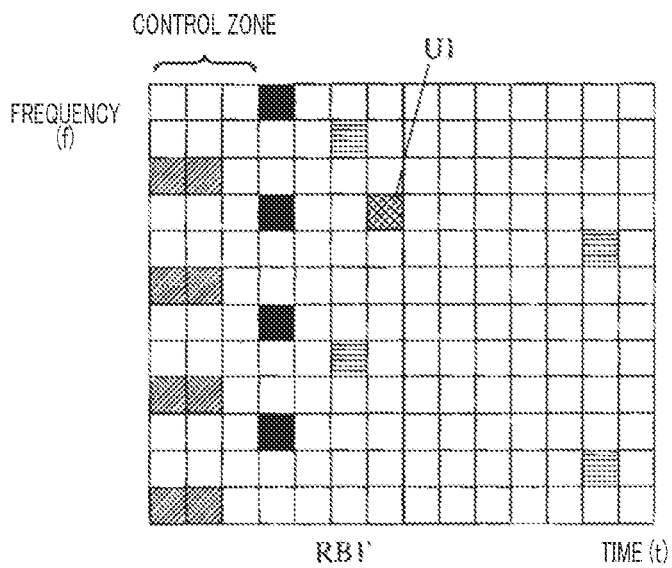
FIG. 7A and FIG. 7B are diagrams illustrating an set up of a user-specific reference signal, as a demodulation reference signal, according to another embodiment of the present disclosure.
Figure 7B:
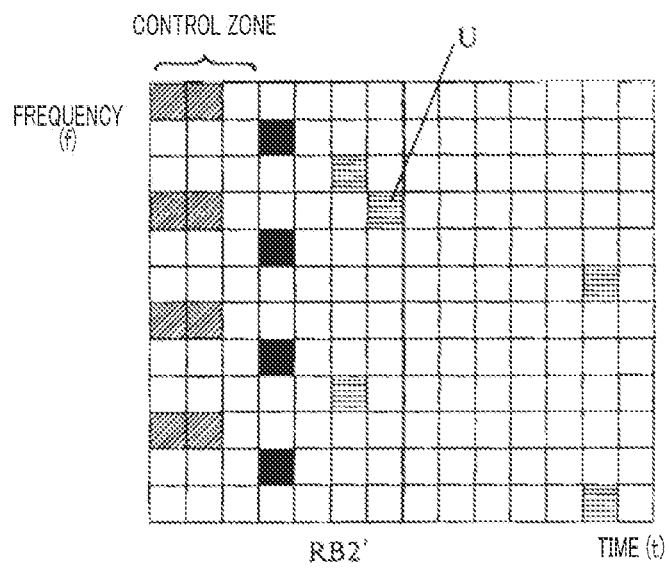

FIG. 7A and FIG. 7B are diagrams showing the set up of the user-specific reference signal, as a demodulation reference signal, according to another embodiment of the present disclosure, and the user-specific reference signal can be set up as a new demodulation reference signal other than a specific demodulation reference signal in the interference resource block. FIG. 7A and FIG. 7B are basically the same as FIG. 6A and FIG. 6B, so the same parts in FIG. 7A and FIG. 7B as those in FIG. 6A and FIG. 6B are not described again; however, a demodulation reference signal set up newly is further shown in interference resource block RB 2' of FIG. 6B and indicated here by U.

According to the embodiment in the present disclosure, base station eNB 2 of the neighboring cell inserts a new demodulation reference signal U at the positions other than the specific demodulation reference signals, in interference resource block RB 2'. Demodulation reference signal U also includes the precoding vector information of the transmission antenna, similar to the other specific demodulation reference signals in interference resource block RB 2'. In such a situation, serving base station eNB 1 of mobile terminal UE 1 can obtain the position of demodulation reference signal U inserted in interference resource block RB 2' by cooperating with base station eNB 2 of the neighboring cell and performs puncturing at the same temporal frequency position of serving resource block RB 1' transmitted by serving base station eNB 1 itself, as shown in the resource element (represented by U1) represented by a shaded lines in serving resource block RB 1' of FIG. 7A. That is, any signal is prevented from being transmitted in resource element U1 of serving resource block RB 1'.

When mobile terminal UE 1 receives serving resource block RB 1' from serving base station eNB 1 and receives interference resource block RB 2' from base station eNB 2 of the neighboring cell by the same temporal frequency resource (within the range of the same time and frequency), mobile terminal UE 1 can measure the total power of signals at the position (the same position) of U and U1. Since resource element U1 does not transmit the signal, the measured total power of the signals is the power of demodulation reference signal transmitted in U. Since a beampattern of the demodulation reference signal of the transmission cell is identical to a beampattern of whole of each transmission signal in the transmission cell, the power can indicate the interference power from neighboring cell eNB 2. This allows mobile terminal UE 1 to obtain the interference power from neighboring cell eNB 2. Also, if the measured interference power from neighboring cell eNB 2 exceeds a predetermined threshold value, mobile terminal UE 1 reports the interference power to serving cell eNB 1.

Figure 8A:
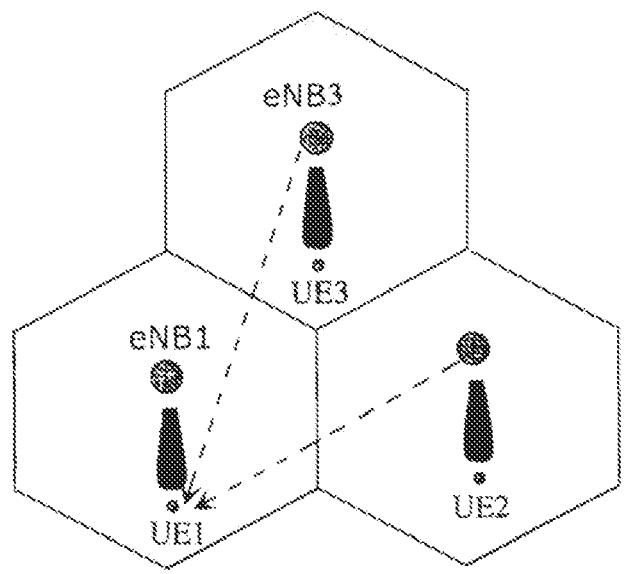
FIG. 8A, FIG. 8B, and FIG. 8C are other schematic diagrams illustrating inter-cell interference.
Figure 8B:
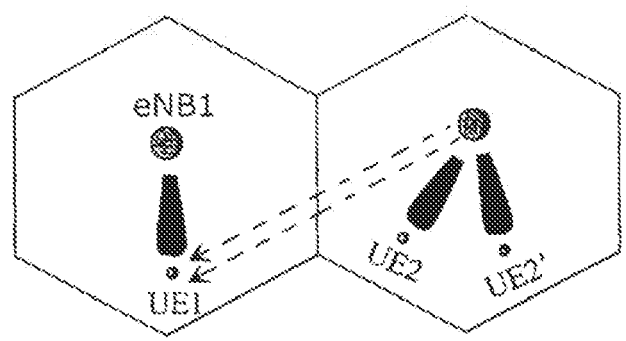
Figure 8C:
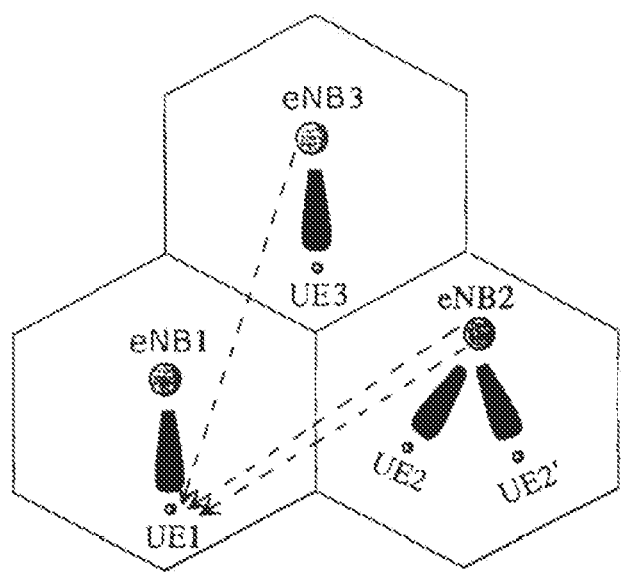

FIG. 8A, FIG. 8B, and FIG. 8C are other schematic diagrams showing inter-cell interference. As shown in FIG. 8A, the quantity of existing neighboring cells is not limited to two, and the quantity thereof may increase to three, for example. Basically, at the time of receiving a signal (serving resource block) from serving base station eNB 1, as shown by a dashed lines in FIG. 8A, mobile terminal UE 1 receives the interference signal (interference resource block) from neighboring cell eNB 2 and the interference signal (interference resource block) from the neighboring cell eNB 3. Mobile terminal UE 1 of serving cell eNB 1 receives two or more interference resource blocks from each of the neighboring cells eNB 2 and eNB 3 on the same temporal frequency resource, depending on different situations. Since these interference resource blocks are positioned on the same temporal frequency resource, these blocks can be regarded as blocks formed by overlapping two layers or multilayers, and the total interference power is equal to the sum of power of the overlapped multilayered interference resource blocks. That is, the interference resource blocks that mobile terminal UE 1 of serving cell eNB 1 receives from the neighboring cells eNB 2 and eNB 3 may be multilayered.

The multilayered interference resource block may be generated, not only when the interference signal shown in FIG. 8A arrives from different cells, but also when, as shown in FIG. 8B, the interference signals result from the signals of a plurality of users. In FIG. 8B, base station eNB 2 of the neighboring cell includes a plurality of (in this case, two) mobile terminals UE 2 and UE 2', and at the time of communicating with the mobile terminals UE 2 and UE 2', cell base station eNB 2 focuses the power of an antenna beam mainly on the directions of UE 2 and UE 2'. At the time of receiving a signal from serving base station eNB 1, mobile terminal UE 1 may receive, as shown by a dashed lines in FIG. 8B, two or more interferences from neighboring cell eNB 2. The interference from the signal from a plurality of users UE 2 and UE 2' can be approximated by applying a multilayered interference resource block.

Further, as shown in FIG. 8C, at the time of receiving a signal from serving base station eNB 1, mobile terminal UE 1 of serving cell eNB 1 may receive a plurality of interferences, as shown by a dashed lines in FIG. 8C, from neighboring cell eNB 2 and the neighboring cell eNB 3. Since these interference resource blocks are positioned on the same temporal frequency resource, these blocks can be considered as a multilayered interference resource blocks obtained by overlapping the resource blocks, and the total interference power is equal to the sum of power of the overlapped multilayered interference resource blocks. That is, the interference resource blocks that mobile terminal UE 1 of serving cell eNB 1 receives from neighboring cell eNB 2 and/or eNB 3 may be multilayered.

Figure 9A:
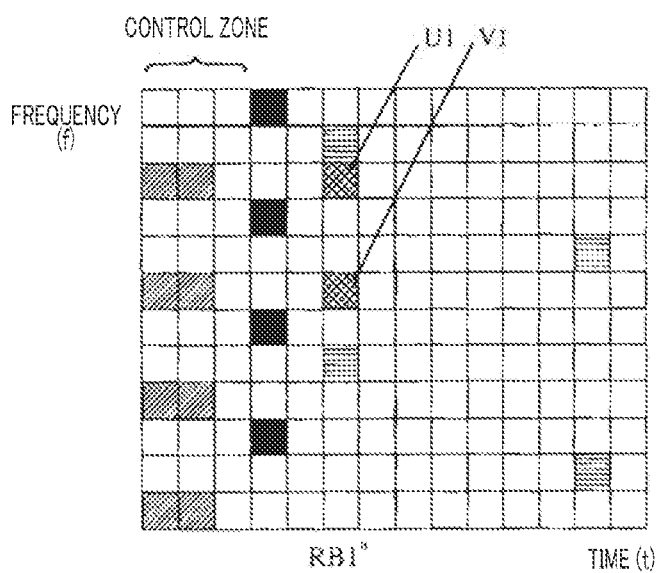
FIG. 9A and FIG. 9B are diagrams illustrating an set up of a user-specific reference signal, as a demodulation reference signal, according to still another embodiment.
Figure 9B:
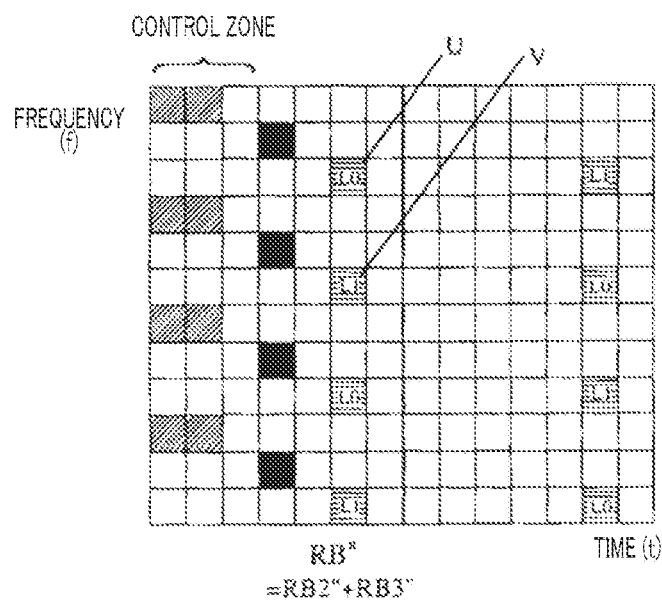

FIG. 9A and FIG. 9B are diagrams showing the set up of the user-specific reference signal, as a demodulation reference signal, according to still another embodiment of the present disclosure. Under an environment shown in FIG. 8A, FIG. 8B, and FIG. 8C, mobile terminal UE 1 receives a serving resource block RB 1" from serving base station eNB 1, and at the same time, receives an interference resource block RB" from base station eNB 2 and/or eNB 3 of the neighboring cell. FIG. 9A shows serving resource block RB 1" that mobile terminal UE 1 receives from serving cell eNB 1, which is basically the same as serving resource block RB 1' shown in FIG. 7A, and the same parts in FIG. 9A as those in FIG. 7A are not described here again.

FIG. 9B shows the overlapped multilayered interference resource blocks that mobile terminal UE 1 receives from the neighboring cells eNB 2 and/or eNB 3 on the same temporal frequency resource (for example, time range from t1 to t2, and frequency range from f1 to f2), i.e., the same figure shows the sum of first-layer interference resource block RB 2," and second-layer interference resource block RB 3." Both the interference resource blocks RB 2" and RB 3" are basically the same as interference resource block RB 2' shown in FIG. 7B, and the same parts in FIG. 9B as those in FIG. 7B are not described here again. A difference is that in the two-layered interference resource blocks RB 2" and RB 3" shown in FIG. 9B, a demodulation reference signal in first-layer interference resource block RB 2," is represented by L0 and the demodulation reference signal in second-layer interference resource block RB 3," is represented by L1. It should be noted that the temporal frequency positions of the demodulation reference signals in serving resource block RB 1," first-layer interference resource block RB 2," and second-layer interference resource block RB 3," do not overlap each other.

In such a situation, serving base station eNB 1 of mobile terminal UE 1 can obtain the respective temporal frequency positions of the demodulation reference signals in interference resource blocks RB 2" and RB 3" by cooperating with base station eNB 2 and/or eNB 3 of the neighboring cell, and performs puncturing at the respective same temporal frequency positions of serving resource block RB 1" transmitted by base station eNB 1 itself of the serving cell. Specifically, the position of demodulation reference signal as the used demodulation reference signals, at the upper left side of first-layer interference resource block RB 2," is selected and represented by U, and at the same time, the position of demodulation reference signal as the same, at the upper left side of second-layer interference resource block RB 3" is selected and represented by V. Base station eNB 1 of the serving cell performs puncturing at two positions corresponding to resource block RB 1" transmitted by base station eNB 1 itself, as shown in the resource elements (each represented by U1 and V1) represented by a shaded line in serving resource block RB 1" of FIG. 9A. That is, any signal is prevented from being transmitted in the resource elements U1 and V1 of serving resource block RB 1."

Also, since the positions of the demodulation reference signals in each resource block are orthogonal, base station eNB 2 and/or eNB 3 of the neighboring cell further performs puncturing at the position corresponding to the position of the demodulation reference signal in other interference resource blocks RB 3" and RB 2" in the two-layered interference resource blocks RB 2" and RB 3," at the time of transmitting the interference resource blocks RB 1" and RB 2," as a result of which any signal is prevented from being transmitted at the punctured position. Specifically, in first-layer interference resource block RB 2," puncturing is performed at the position corresponding to the position of the demodulation reference signal V of second-layer interference resource block RB 3" (for example, represented by V1') and also in second-layer interference resource block RB 3," puncturing is performed at the position corresponding to the position of demodulation reference signal U of first-layer interference resource block RB 2" (for example, represented by U1'). Thus, the orthogonalization of each of demodulation reference signal U in first-layer interference resource block RB 2" and the demodulation reference signal V in second-layer interference resource block RB 3" is realized. That is, in the embodiment of the present disclosure, the user-specific reference signal (in this case, the demodulation reference signal) is set up in one layer in the interference resource block of each layer, puncturing is performed at the same temporal frequency position as the user-specific reference signal in the interference resource block in a layer other than this one layer, and any signal is prevented from being transmitted at the punctured position.

When mobile terminal UE 1 receives the serving signal from serving base station eNB 1 and receives the interference signal from base station eNB 2 and/or eNB 3 of the neighboring cell by the same temporal frequency resource (within the range of the same time and frequency), mobile terminal UE 1 can measure the respective power of signals at the positions of each resource block U and V. Neither the resource elements U1 and V1 nor the resource elements U1' and V1' transmit a signal, the measured signal power in the resource element U and the measured signal power in the resource element V are the interference power of the first-layer resource block RB 2" and the second-layer resource block RB 3," respectively. Thus, mobile terminal UE 1 can obtain the interference power from each neighboring cell eNB 2 and/or eNB 3. Further, if the measured interference power from neighboring cell eNB 2 and/or eNB 3 exceeds a predetermined threshold value, mobile terminal UE 1 reports the interference power exceeding the threshold value to serving cell eNB 1.

It is possible to prove that "the signal power of interference resource block RB" is equal to the sum of "signal power of interference resource block RB 2" and "the signal power of interference resource block RB 3", as below.

As mentioned above, when the interference from the neighboring cells is the multilayered signal, the reference signals of the different layers, for example, should be orthogonal such as orthogonal with dividing the time and orthogonal with dividing the frequency. In order to solve the problem of the power measurement of the multilayered signals, given that two-layered interference is transmitted here, the corresponding mathematical model is:

$$\vec{w}_{data} = \vec{w}_1 \cdot s_1 + \vec{w}_2 \cdot s_2$$

where, $\vec{w}_{data}$ indicates entire interference, $S_1$ and $S_2$ indicate data of the first layer and second layer, respectively, and $S_1$ and $S_2$ are independent random variables in the derivation process, i.e., the mutual correlations are assumed to be zero. $\vec{w}_1$ and $\vec{w}_2$ indicate the precoding vector of the first layer and the precoding vector of the second layer, respectively. Then, in the direction θ, the received interference signal is:

$$S_{data}(\theta) = \vec{v}_\theta^h \cdot \vec{w}_{data}$$

where, $S_{data}(\theta)$ is the interference signal received in the direction θ, $\vec{v}_\theta$ s a response vector of a matrix in the direction θ, $(.)^H$ indicates conjugate substitution.

Then, power to be received in the direction θ is:

$$P(\theta) = E[S_{data}(\theta) \cdot S_{data}^H(\theta)] = E\left[\vec{v}_\theta^H \cdot \vec{w}_{data} \cdot \vec{w}_{data}^H \cdot \vec{v}_\theta\right] = \vec{v}_\theta^H \cdot E\left[\vec{w}_{data} \cdot \vec{w}_{data}^H\right] \cdot \vec{v}_\theta =$$

$$\vec{v}_\theta^H \cdot E\left[(\vec{w}_1 \cdot s_1 + \vec{w}_2 \cdot s_2)(\vec{w}_1 \cdot s_1 + \vec{w}_2 \cdot s_2)^H\right] \cdot \vec{v}_\theta =$$

$$\vec{v}_\theta^H \cdot \vec{w}_1 \cdot \vec{w}_1^H \cdot \vec{v}_\theta + \vec{v}_\theta^H \cdot \vec{w}_2 \cdot \vec{w}_2^H \cdot \vec{v}_\theta = P_1(\theta) + P_2(\theta)$$

where, $P_1(\theta)$ and $P_2(\theta)$ indicate the power in the direction θ of the signal of the first layer and the signal of the second layer, respectively.

It can be understood from the above derivation that the solution of the present disclosure is correct as it can be seen that the power of the multilayered data in a certain direction (beampattern—can be adjusted corresponding to the precoding vector of an antenna array by the base station) is the sum of the power (beampatterns) of the data of each layer in that direction. In the demodulation reference signal of a code division multiplex, the beampattern is completely different from the beampattern of the data, it should be noted that the demodulation reference signal cannot be used in the estimation of interference power.

An example of a transmission signal of the demodulation reference signal of the code division multiplex includes:

$$\vec{w}_{RS} = \vec{w}_1 \cdot 1 + \vec{w}_2 \cdot 1$$

Similar to the above-described calculation of the beampattern of the data, the following result is obtained:

$$P(\theta) = S_{RS}(\theta) \cdot S_{RS}^H(\theta) = \vec{v}_\theta^H \cdot \vec{w}_{RS} \cdot \vec{w}_{RS}^H \cdot \vec{v}_\theta =$$

$$\vec{v}_\theta^H \cdot \vec{w}_{RS} \cdot \vec{w}_{RS}^H \cdot \vec{v}_\theta = \vec{v}_\theta^H \cdot (\vec{w}_1 + \vec{w}_2)(\vec{w}_1 + \vec{w}_2)^H \cdot \vec{v}_\theta = \vec{v}_\theta^H \cdot \vec{w}_1 \cdot \vec{w}_1^H \cdot \vec{v}_\theta +$$

$$\vec{v}_\theta^H \cdot \vec{w}_2 \cdot \vec{w}_2^H \cdot \vec{v}_\theta + \vec{v}_\theta^H \cdot \vec{w}_1 \cdot \vec{w}_2^H \cdot \vec{v}_\theta + \vec{v}_\theta^H \cdot \vec{w}_2 \cdot \vec{w}_1^H \cdot \vec{v}_\theta = ????$$

From the above calculation, it can be understood that the demodulation reference signal of the code multiplex cannot accurately reflect the interference power of the data.

Figure 10:
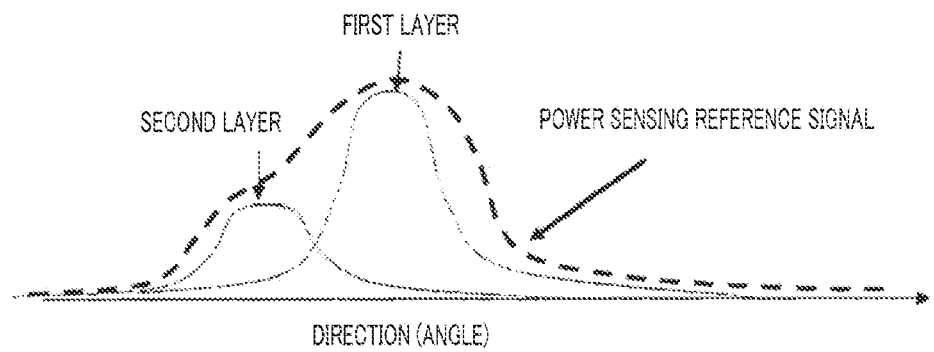
FIG. 10 is a diagram illustrating a power sensing reference signal according to still another embodiment of the present disclosure.

FIG. 10 is a diagram illustrating a power sensing reference signal according to still another embodiment of the present disclosure.

According to the still another embodiment of the present disclosure, one type of new user-specific reference signal is designed, and herein, is referred to as "power sensing reference signal."

The power sensing reference signal is a reference signal that undergoes the precoding and is transmitted along with the data that base station eNB 2 and/or eNB 3 of the neighboring cells transmits to the mobile terminals UE 2, UE 2' and/or UE 3, and includes information of a precoding vector of a transmission antenna of the cell. From the above, it can be understood that the demodulation reference signal of a code division multiplex cannot accurately reflect the interference power of the data, and for a similar reason, this can be applicable to any user-specific reference signal, that is, any user-specific reference signal of a code division multiplex cannot accurately reflect the interference power of data. From this fact, it can be understood that a predetermined design of the precoding vector must be firstly applied to the power sensing reference signal so as to realize the estimation of the interference power.

As shown in FIG. 10, for example, the power sensing reference signal is set up in the neighboring cells eNB 2 and/or eNB 3 so that the beampattern of the power sensing reference signal is the sum of the beampatterns of all the interference signals (multilayered interference), received by mobile terminal UE 1 of serving cell eNB 1, from the neighboring cell eNB 2 and/or eNB 3, i.e., is equal to the superposition of the beampatterns of the interference signal (interference resource block RB 2") of first layer and the interference signal (interference resource block RB 3") of the second-layer. That is, in the present disclosure, it is possible to set up the user-specific reference signal as the power sensing reference signal, and at the same time, to make the beampattern of the power sensing reference signal equal or approximately equal to the superposition of the beampatterns of all the signals in each interference resource block.

The design of the power sensing reference signal is achieved according to one or several types of the following various types of methods:

Method 1: a precoding vector database is searched in the base station (for example, base station eNB 2 and/or eNB 3 of the neighboring cell) that transmits the interference signal, and a precoding vector that matches most accurately the summed beampatterns of the transmission signal of the interference resource block of each layer is found after which the resultant vector is regarded as the precoding vector of the designed power sensing reference signal.

Method 2: a precoding vector of a signal of the interference resource block in each layer is set up based on a codebook and the quantity of available precoding matrixes is made finite. In this situation, the precoding vector of the power sensing reference signal corresponding to a certain precoding matrix can be stored in advance.

Method 3: In addition to the calculation of beampattern of the signal of each layer in the interference resource block, the beampattern of each layer is overlapped to consider the overlapped chart as the beampattern of the power sensing reference signal, and thereafter, a spectral decomposition is performed based on the beampattern of the power sensing reference signal to obtain the precoding vector of the power sensing reference signal. The calculation method of Method 3 is as follows: As shown in FIG. 10, when a two-layered interference resource block is provided, the precoding vectors of first-layer interference resource block RB 2," and second-layer interference resource block RB 3," are each known for the base station eNB 2 and/or eNB 3 of the neighboring cell, and therefore, the base station eNB 2 and/or eNB 3 of the neighboring cell performs a fast Fourier transform on the precoding vectors of the interference resource blocks RB 2" and RB 3" respectively, after which the respective beampatterns of the interference resource blocks RB 2" and RB 3" are obtained by retrieving an absolute value of the result obtained after the fast Fourier transform and the respective beampatterns of the interference resource blocks RB 2" and RB 3 are overlapped, as a result of which the entire overlapped beampattern is obtained. Subsequently, the precoding vector of the power sensing reference signal is obtained by spectral decomposition of this entire beampattern, and at the same time, the power sensing reference signal corresponding to the entire beampattern is set up according to base station eNB 2 and/or eNB 3 of the neighboring cell from the obtained precoding vector. The number of layers of interference resource blocks does not limit the present disclosure and the interference resource blocks of this embodiment in the present disclosure can include any number of layers.

The power sensing reference signal may or may not occupy the temporal frequency resource of the demodulation reference signal (DM-RS). In reality, the specific position of the power sensing reference signal is not important, and it may suffice if the puncturing position and the position of power sensing reference signal correspond to each other; the important point is that the beampattern of the power sensing reference signal should be equal to or approximately equal to the sum of the beampatterns of a signal of each layer. In this case, the interfered cell can know the total interference power from the reception power of the power sensing reference signal.

Figure 11A:
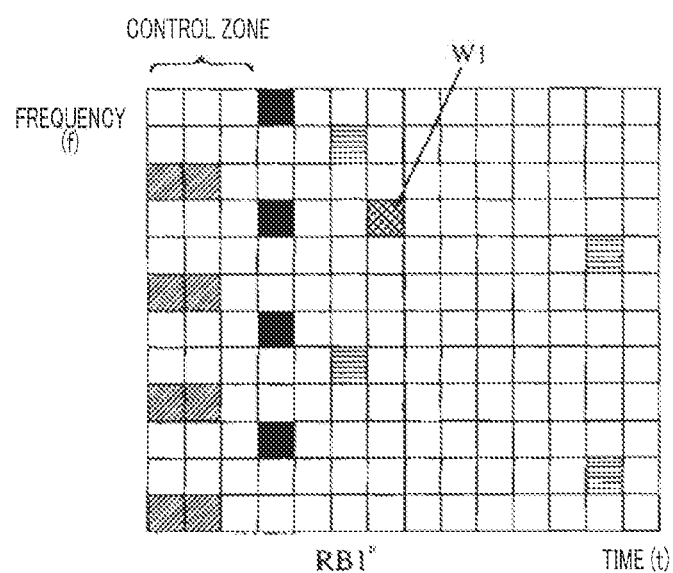
FIG. 11A and FIG. 11B are diagrams illustrating an set up of the power sensing reference signal to a data signal position according to the embodiment of the present disclosure.
Figure 11B:
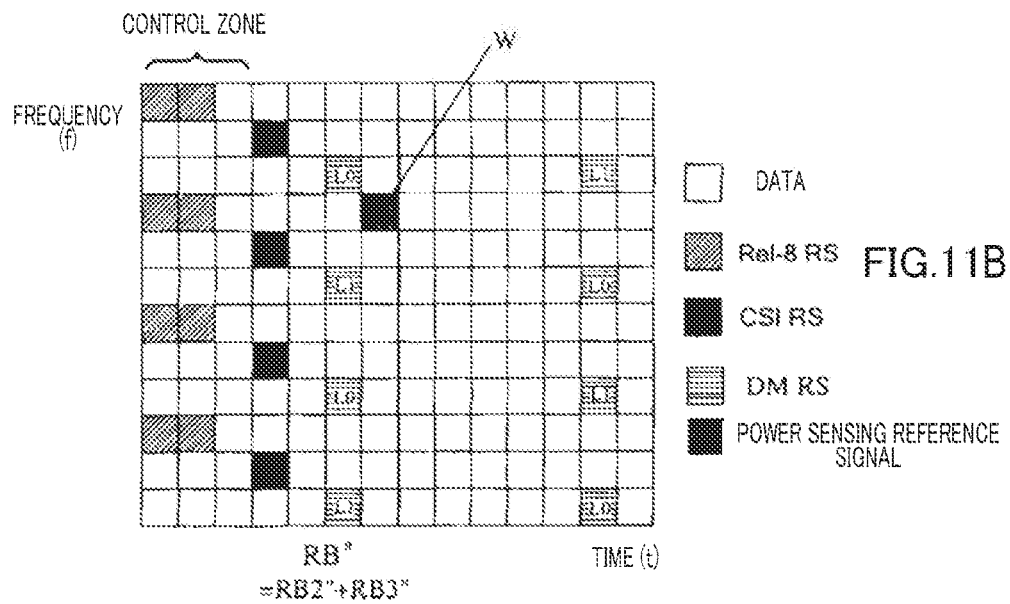

FIG. 11A and FIG. 11B are diagrams illustrating the set up of the power sensing reference signal to the data signal position, according to the embodiment of the present disclosure. FIG. 11A and FIG. 11B are basically the same as FIG. 9A and FIG. 9B, and the same parts in FIG. 11A and FIG. 11B as those in FIG. 9A and FIG. 9B are not described again.

In FIG. 11B, there is shown a power sensing reference signal that can be set up in either first-layer interference resource block RB 2" or second-layer interference resource block RB 3," and it is assumed herein that the power sensing reference signal is set up on second-layer interference resource block RB 3," and is set up in the resource element of second-layer interference resource block RB 3," used for transmitting the data signal. In the figure, the power sensing reference signal is represented by W. Thus, the resource element cannot transmit the data signal.

In such a situation, base station eNB 1 of serving cell, as shown in the resource element (represented by W1) represented by a shaded lines in serving resource block RB 1" of FIG. 11A, performs puncturing at the position corresponding to power sensing reference signal W in resource block RB 1" transmitted by base station eNB 1 itself. That is, any signal is prevented from being transmitted in resource element W1 of serving resource block RB 1." Further, because of the orthogonal arrangement at the position of the power sensing reference signals in each resource block, when interference resource blocks RB 2" and RB 3" are transmitted, base station eNB 2 and/or eNB 3 of the neighboring cell further performs puncturing (not shown) at position W1' corresponding to the position of the power sensing reference signal of the second-layer interference resource block RB 3," in first-layer interference resource block RB 2," as a result of which any signal is prevented from being transmitted at the punctured position. Thus, the orthogonalization of power sensing reference signal W is achieved in the second-layer interference resource block RB 3." That is, in the embodiment of the present disclosure, the power sensing reference signal is set up in one layer of the multilayered interference resource block, and the puncturing is performed at the same temporal frequency position as the power sensing reference signal in the interference resource block in a layer other than the one layer so as to prevent any signal from being transmitted.

In the present embodiment, the power sensing reference signal occupies the resource element used for the transmission of the data signal, in other words, the power sensing reference signal is set up at the temporal frequency position of the data signal in the interference resource block.

When mobile terminal UE 1 receives the serving signal from serving base station eNB 1 and uses the same temporal frequency resource so as to receive the interference signal of a multilayer (for example, two layers) from base station eNB 2 and/or eNB 3 of the neighboring cell, mobile terminal UE 1 can measure the signal power at the position of power sensing reference signal W. The beampattern of power sensing reference signal W is equal to the sum of the respective beampatterns of first-layer interference resource block RB 2" and the second-layer interference resource block RB 3," and any signal is prevented from being transmitted in resource elements W1 and W1', and therefore, the measured signal power is the total interference power of first-layer interference resource block RB 2" and the second-layer interference resource block RB 3." Thus, mobile terminal UE 1 can obtain the interference power from neighboring cell eNB 2 and/or eNB 3. Also, if the measured interference power from neighboring cell eNB 2 and/or eNB 3 exceeds a predetermined threshold value, then mobile terminal UE 1 reports the interference power exceeding the threshold value to serving cell eNB 1.

Figure 12A:
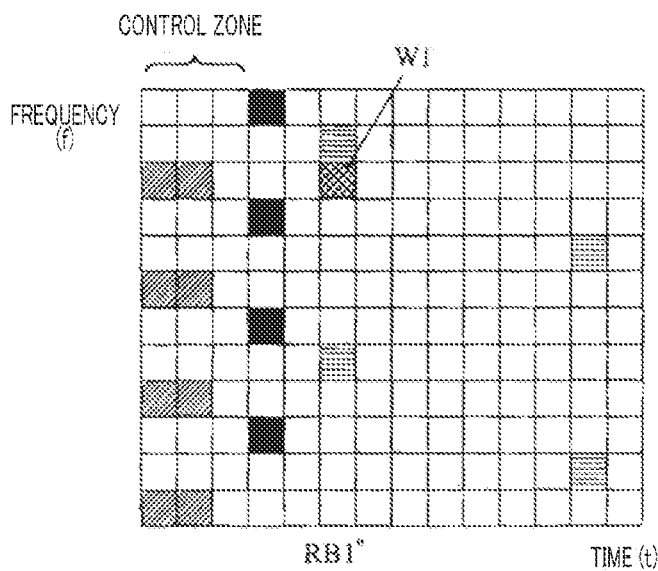
FIG. 12A and FIG. 12B are diagrams illustrating an set up of the power sensing reference signal to a demodulation reference signal position according to the embodiment of the present disclosure.
Figure 12B:
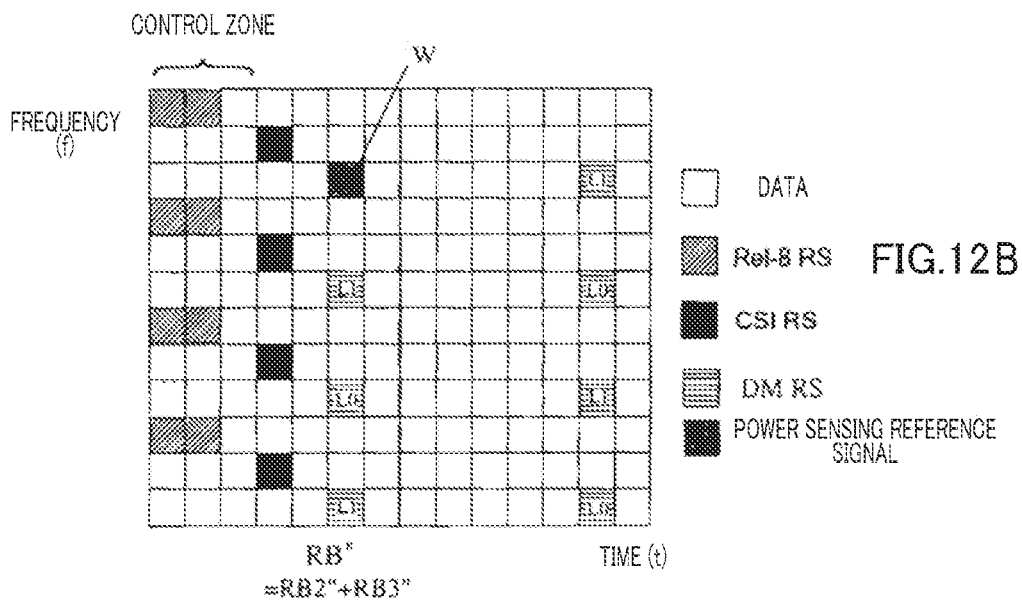

FIG. 12A and FIG. 12B are diagrams illustrating the set up of the power sensing reference signal at the position of the demodulation reference signal, according to the embodiment of the present disclosure. FIG. 12A and FIG. 12B are basically the same as FIG. 11A and FIG. 11B, and the same parts in FIG. 12A and FIG. 12B as those in FIG. 11A and FIG. 11B are not described here again.

According to the embodiment of the present disclosure, it is possible to set up the power sensing reference signal at the position of any one of the demodulation reference signals of first-layer interference resource block RB 2" and second-layer interference resource block RB 3," and in FIG. 12B, there is shown that the power sensing reference signal is set up at the position of demodulation reference signal of first-layer interference resource block RB 2," which is represented by W. Thus, the demodulation reference signal is not transmitted at the position.

In such a situation, base station eNB 1 of the serving cell, as shown in the resource element (represented by W1) represented by a shaded line in serving resource block RB 1" of FIG. 12A performs puncturing at the position corresponding to power sensing reference signal W in resource block RB 1" transmitted by base station eNB 1 itself. That is, any signal is prevented from being transmitted in resource element W1 of serving resource block RB 1." Also, because of the orthogonal arrangement at the position of the power sensing reference signal in each resource block, at the time of transmitting interference resource blocks RB 2" and RB 3," base stations eNB 2 and/or eNB 3 of the neighboring cell performs further puncturing (not shown) at position W1' corresponding to the position of the power sensing reference signal of first-layer interference resource block RB 2" in second-layer interference resource block RB 3," and as a result of which any signal is prevented from being transmitted at the punctured position. Thus, the orthogonalization of power sensing reference signal W can be achieved in first-layer interference resource block RB 2." That is, in the embodiment of the present disclosure, the power sensing reference signal is set up in one layer of the multilayered interference resource block, and the puncturing is performed at the same temporal frequency position as the power sensing reference signal in the interference resource block in a layer other than the one layer so as to prevent any signal from being transmitted.

In this embodiment, the power sensing reference signal occupies the resource element for the transmission of the demodulation reference signal, in other words, the power sensing reference signal is set up at the temporal frequency position of the demodulation reference signal in the interference resource block, by which it is possible to save the temporal frequency resources of the data transmission.

When mobile terminal UE 1 receives the serving signal from serving base station eNB 1 and receives the interference signal with multilayer (for example, two layers) from base station eNB 2 and/or eNB 3 of the neighboring cell by using the same temporal frequency resource, mobile terminal UE 1 can measure the signal power at the position of power sensing reference signal W. The beampattern of power sensing reference signal W is equal to the sum of each of the beampatterns of first-layer interference resource block RB 2" and second-layer interference resource block RB 3," and any signal is prevented from being transmitted in resource elements W1 and W1'. As a result, the measured signal power is the total interference power of first-layer interference resource block RB 2" and second-layer interference resource block RB 3." Thus, mobile terminal UE 1 can obtain interference power from neighboring cell eNB 2 and/or eNB 3. Also, if the measured interference power from neighboring cell eNB 2 and/or eNB 3 exceeds a predetermined threshold value, mobile terminal UE 1 reports the interference power that exceeds threshold value, to serving cell eNB 1.

Figure 13A:
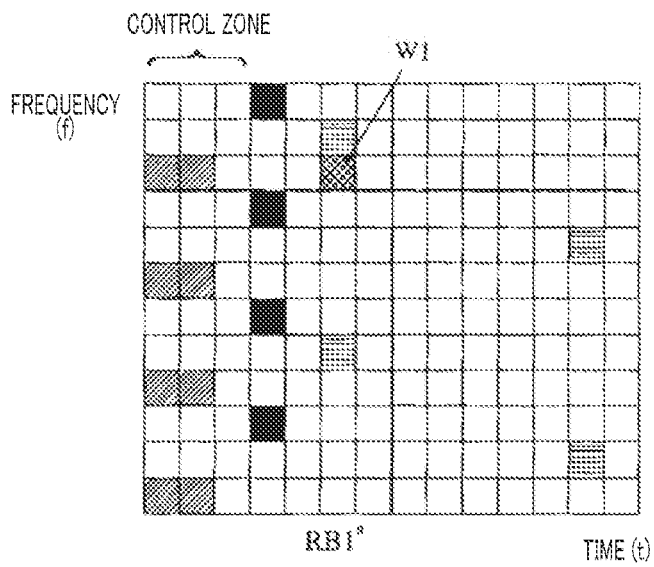
FIG. 13A and FIG. 13B are another diagrams illustrating an set up of the power sensing reference signal to the demodulation reference signal position according to the embodiment of the present disclosure.
Figure 13B:
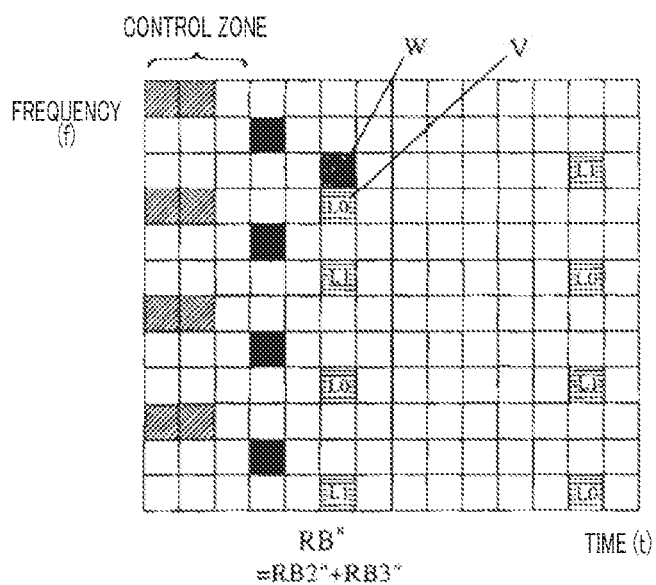

FIG. 13A and FIG. 13B are another diagrams illustrating the set up of the power sensing reference signal at the position of the demodulation reference signal, according to the embodiment of the present disclosure. FIG. 13A and FIG. 13B are basically the same as FIG. 12A and FIG. 12B, and the same parts in FIG. 13A and FIG. 13B as those in FIG. 12A and FIG. 12B are not described here again.

According to the embodiment of the present disclosure, the power sensing reference signal can be set up at the position of any one of the demodulation reference signal of first-layer interference resource block RB 2" and second-layer interference resource block RB 3," and the demodulation reference signal of which the position has been occupied is set up at another temporal frequency position of the interference resource block. In FIG. 13B, it is shown that the power sensing reference signal (represented by W) is set up at the position of the demodulation reference signal of first-layer interference resource block RB 2," and at the same time, the demodulation reference signal (represented by V) of which the position has been occupied is set up at the temporal frequency position for transmission of the data signal in the interference resource block.

In such a situation, as shown in the resource element (represented by W1) represented by a shaded line in serving resource block RB 1" of FIG. 13A, base station eNB 1 of the serving cell performs puncturing at the position corresponding to power sensing reference signal W in resource block RB 1" transmitted by base station eNB 1 itself. That is, any signal is prevented from being transmitted in resource element W1 of serving resource block RB 1." Also, because of the orthogonal arrangement at the position of the power sensing reference signal in each resource block, at the time of transmitting interference resource blocks RB 2" and RB 3," base station eNB 2 and/or eNB 3 of the neighboring cell further performs puncturing (not shown) at position W1' corresponding to the position of power sensing reference signal W of first-layer interference resource block RB 2" in second-layer interference resource block RB 3," as a result of which any signal is prevented from being transmitted at the punctured position. Thus, the orthogonalization of power sensing reference signal W can be achieved in first-layer interference resource block RB 2." That is, in the embodiment of the present disclosure, the power sensing reference signal is set up in one layer of the multilayered interference resource block and puncturing is performed at the same temporal frequency position as the power sensing reference signal in the interference resource block of a layer other than the one layer so as to prevent any signal from being transmitted.

In this embodiment, the power sensing reference signal occupies the resource element for transmission of the demodulation reference signal and the demodulation reference signal of which the position has been occupied is set up at another temporal frequency position of the interference resource block, and thus, with respect to the single-layered or multilayered interference source, in either of the present methods, any overheads of puncturing can be retained or reduced and the accuracy for the channel estimation during demodulation is not lowered.

When mobile terminal UE 1 receives the serving signal from serving base station eNB 1 and when the multilayered (for example, two layered) interference signal is received from base station eNB 2 and/or eNB 3 of the neighboring cell by using the same temporal frequency resource, mobile terminal UE 1 can measure the signal power at the position of power sensing reference signal W. The beampattern of power sensing reference signal W is equal to the sum of each of the beampatterns of first-layer interference resource block RB 2" and second-layer interference resource block RB 3" and since any signal is prevented from being transmitted in resource elements W1 and W1', the measured signal power is the total interference power of first-layer interference resource block RB 2" and second-layer interference resource block RB 3." Thus, mobile terminal UE 1 can obtain the interference power from neighboring cell eNB 2 and/or eNB 3. Also, if the measured interference power from neighboring cell eNB 2 and/or eNB 3 exceeds a predetermined threshold value, mobile terminal UE 1 reports the interference power that exceeds the threshold value to serving cell eNB 1.

According to another embodiment of the present disclosure, the power sensing reference signal is transmitted by occupying the position of a CSI reference signal of either first-layer resource block RB 2" and second-layer resource block RB 3" in two-layered resource block RB" (equal to RB 2"+RB 3") as the interference, and the puncturing can be performed at the corresponding position of serving resource block RB 1" which is transmitted to mobile terminal UE 1 by serving cell eNB 1. At the same time, the puncturing is also performed at the corresponding position of the interference resource block in another layer corresponding to the interference resource block of which the CSI reference signal is occupied, in other words, the CSI reference signals are orthogonal. That is, the power sensing reference signal is set up in one layer of the multilayered interference resource block, and by puncturing at the same temporal frequency position as the power sensing reference signal in the resource block in a layer other than the one layer so as to prevent any signal from being transmitted. Here, the power sensing reference signal occupies the position for transmitting channel status information reference signal, in other words, the power sensing reference signal is set up at the temporal frequency position of the channel status information reference signal in the interference resource block, and in this way, the temporal frequency resources of the data transmission can be further saved. In this method, the overhead resulting from the puncturing can be reduced and the demodulation accuracy in the neighboring cell is not affected.

According to still another embodiment of the present disclosure, in two-layered resource blocks RB 2" and RB 3" as an interference source, the power sensing reference signal is transmitted by occupying the position in the control zone of interference resource block RB 2" or RB 3" in a certain layer, and the puncturing is performed at the corresponding position of serving resource block RB 1" transmitted to mobile terminal UE 1 by serving cell eNB 1, and the puncturing can also be performed at the corresponding position of the interference resource block in a layer corresponding to the interference resource block of which the position has been occupied. In other words, the power sensing reference signal is set up in one layer in the multilayered interference resource block, and the puncturing is performed at the same temporal frequency position as the power sensing reference signal in the resource block in another layer other than the one layer so as to prevent any signal from being transmitted. No data is transmitted in the resource element punctured in each resource block. Here, the power sensing reference signal occupies the position in the control zone, in other words, the position of the power sensing reference signal is set up in the control zone of the interference resource block, and in this method, it is possible to reduce the overheads caused by the puncturing and it is possible not to affect the demodulation accuracy in the neighboring cell and not to reduce the accuracy of the channel estimation of the neighboring cell. However, this position can be used only when the available resource elements are still present in the control zone.

Figure 14:
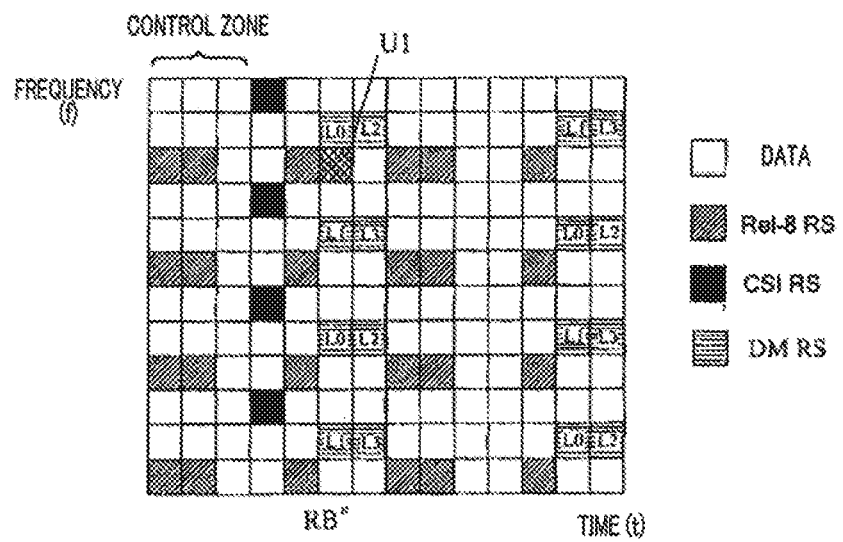
FIG. 14 is a diagram illustrating an set up of the power sensing reference signal according to another embodiment of the present disclosure.

FIG. 14 is a diagram illustrating the set up of the power sensing reference signal according to another embodiment of the present disclosure. In interference resource block RB" shown in FIG. 14, a 4-layered interference resource block is shown, the demodulation reference signals of the interference resource block of each layer are represented by L0, L1, L2, and L3, respectively, and an Rel-8 RS signal is indicated by a resource element represented by a slanting line. According to this embodiment, the position of the power sensing reference signal is separated from the Rel-8 RS signal, that is, by separating the temporal frequency position of the power sensing reference signal and that of the Rel-8 RS reference signal in the interference resource block of each layer from each other, it is possible to avoid the adverse effects arising in the course of the signal reception.

Figure 15:
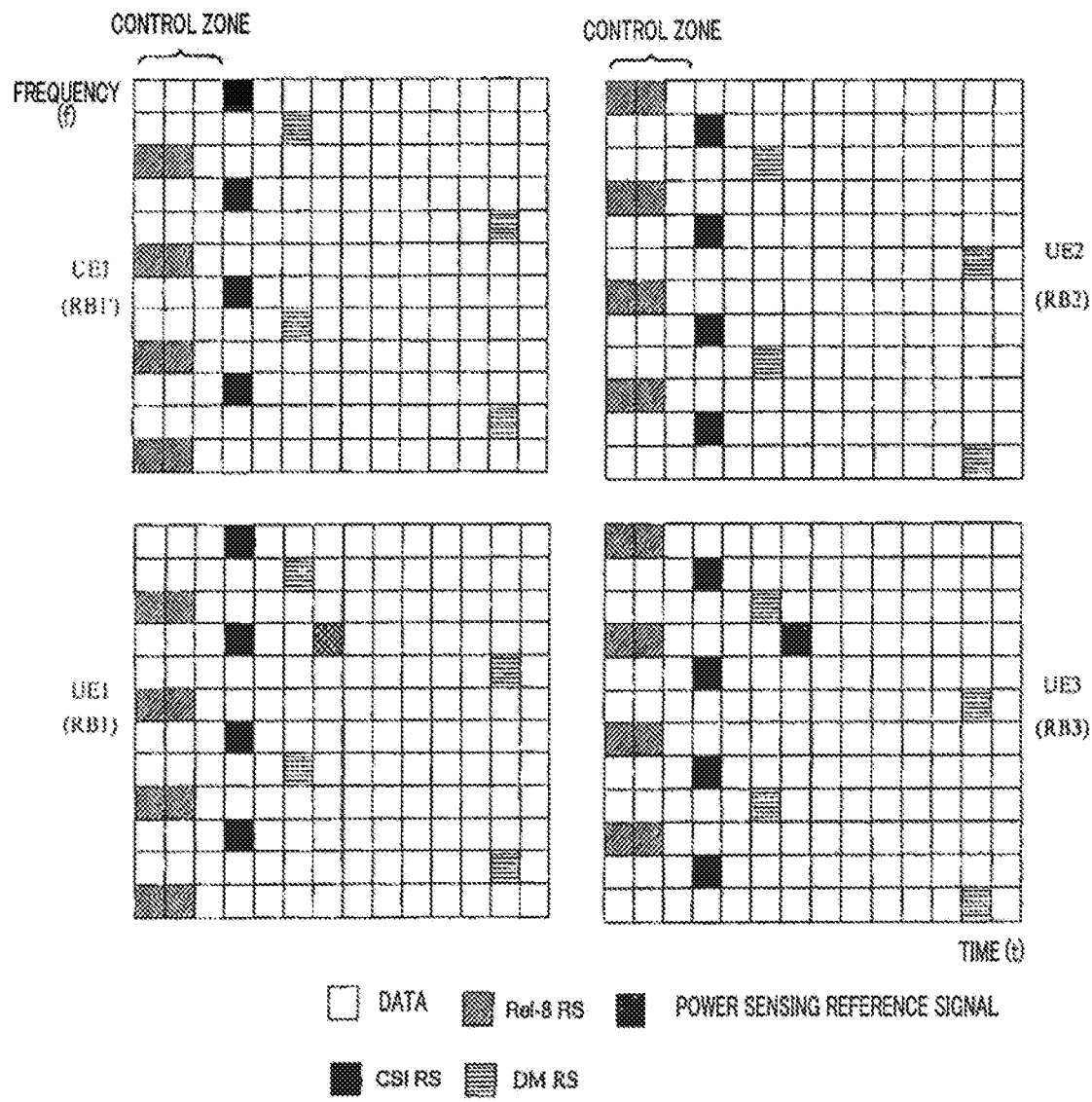
FIG. 15 is a diagram illustrating an set up of the power sensing reference signal when interference arrives from a plurality of terminals of neighboring cells.

FIG. 15 is a diagram illustrating the set up of the power sensing reference signal when interference arrives from a plurality of terminals of the neighboring cells. When the interference source is a signal that the base station of the neighboring cell transmits to a plurality of mobile terminals UE, it is probable that the interfered mobile terminal UE 1 occupies a plurality of resource blocks (generally, including several resource blocks continuing in time and frequency), and thus, the different resource blocks of the interfered mobile terminal UE 1 may be interfered by the signal of the different mobile terminals of the neighboring cell. In this situation, even when each mobile terminal of the neighboring cell receives a single-layered signal, it is probable that the interference from each resource block of the serving cell is multilayered, i.e., the resource block of each layer may arrive from the signal of the different mobile terminal in the neighboring cell. In this situation, the interference from the signals of a plurality of mobile terminals can be approximated using the power sensing reference signal, and the design method therefor is the same as the design of the multilayered interference signal, as shown in FIG. 15.

In FIG. 15, for example, resource blocks RB 1 and RB 1' are two serving resource blocks continuing in the frequency domain, transmitted by base station eNB 1 of the serving cell to mobile terminal UE 1. Further, resource blocks RB 2 and RB 3 are two resource blocks continuing in the frequency domain, transmitted by the base station (e.g., eNB 2) of the neighboring cell to respective different mobile terminals UE 2 and UE 3. The structure of each resource block in FIG. 15 is the same as the preceding one, and thus, the structure is not described here again. In the situation shown in FIG. 15, each of mobile terminals UE 2 and UE 3 receives only the single-layered signal, however, mobile terminal UE 1 of the serving cell still receives the interference from the signal transmitted to two mobile terminals UE 2 and UE 3 from neighboring cell eNB 2 on a specific temporal frequency resource shown in FIG. 15. In this situation, base station eNB 2 of the neighboring cell can set up the power sensing reference signal only on one part of the resource block (e.g., one resource block RB 3), and the beampattern of this power sensing reference signal should be equal to or approximately equal to the sum of the beampatterns of two-layered resource blocks RB 2 and RB 3.

Figure 16:
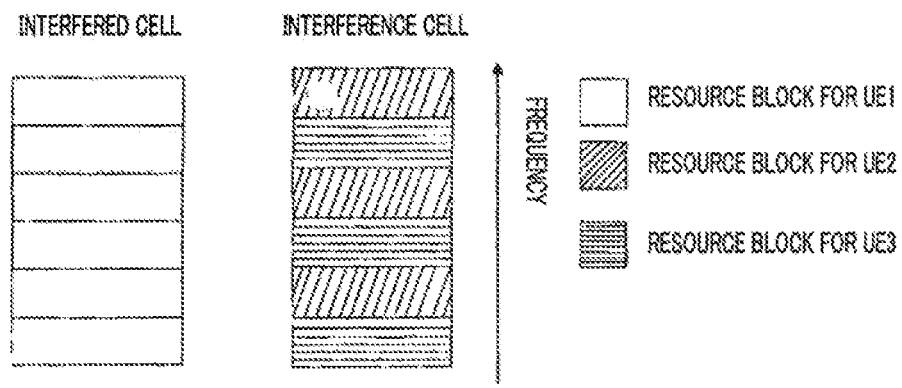
FIG. 16 is a diagram illustrating another example of an set up of the power sensing reference signal when the interference arrives from the plurality of terminals of the neighboring cells.

FIG. 16 is a diagram illustrating another example of the set up of the power sensing reference signal when the interference arrives from a plurality of terminals of the neighboring cell. As shown in FIG. 16, a plurality of resource blocks on the left side are serving resources blocks that base station eNB 1 of the serving cell transmits to its mobile terminal UE 1, the resource blocks represented by a slanting line on the right side are resource blocks that neighboring cell eNB 2 transmits to mobile terminal UE 2 in neighboring cell eNB 2, and the resource blocks represented by a horizontal line on the right side are resource blocks that neighboring cell eNB 2 transmits to mobile terminal UE 3 in neighboring cell eNB 2. In this situation, base station eNB 2 of the neighboring cell can set up the power sensing reference signal only on one part of the resource block, and the beampattern of the power sensing reference signal should be equal to the sum of the beampatterns of all the resource blocks transmitted to mobile terminals UE 2 and UE 3.

Figure 17:
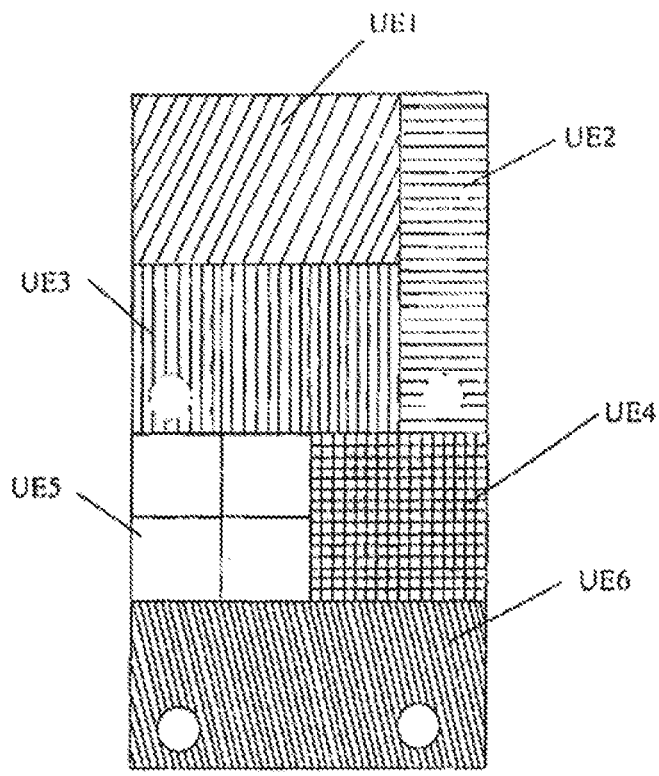
FIG. 17 is a diagram illustrating the generation of an interference resource block due to the existence of a plurality of mobile terminals in the neighboring cells.

FIG. 17 is a diagram illustrating generation of the interference resource block when a plurality of mobile terminals exists in the neighboring cell. Given the overhead reduction, it is not necessary to set up the power sensing reference signal in all the interference resource blocks. In this situation, one power sensing reference signal should be set up in several resource blocks separated from each other. One option of the density of the power sensing reference signal is a definite density in which irrespective of the type of a signal scheduler in the base station and the degree of allocation (neighboring or non-neighboring) of the resource blocks of the mobile terminal, the density of the power sensing reference signal is always uniform. Another option is an adjustable density in which, for example, regarding the allocation of the neighboring resource blocks, the density of the power sensing reference signal is relatively sparse, and on the contrary, regarding the allocation of non-neighboring resource blocks, the density of the power sensing reference signal is relatively tight. Regarding the solution in which the density can be adjusted, generally, the adjustment of density should not be too fast so that the density of a new power sensing reference signal can be notified to the interfered cell.

As shown in FIG. 17, the resource blocks represented by different lines are resource blocks of different mobile terminals, and these resource blocks are contiguous on time and frequency. In the figure, "○ (circle)" represents a resource block including the power sensing reference signal. In this situation, in a plurality of interference resource blocks contiguous by the temporal frequency, the power sensing reference signals are set up at fixed temporal frequency intervals.

Further, when there are one or more interference cells, the power sensing reference signal of each cell should have an appropriate multiplexing mechanism. Based on the multiplexing mechanism of time division, frequency division, or code division, the power sensing reference signal can be multiplexed.

Figure 18:
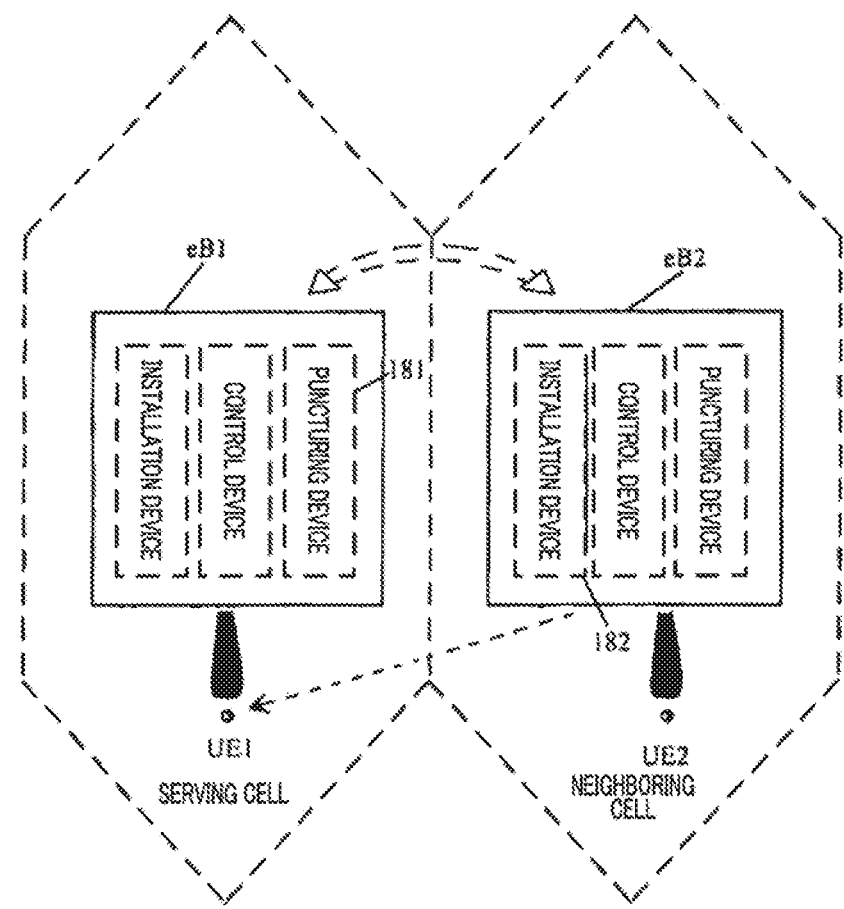
FIG. 18 is a diagram illustrating a basic arrangement of a radio communication system to realize the embodiment of the present disclosure.

FIG. 18 is a diagram illustrating the basic arrangement of a radio communication system for realizing the embodiment of this disclosure. As shown in FIG. 18, the radio communication system of the embodiment of the present disclosure includes a serving cell and a neighboring cell, and the serving cell and the neighboring cell include serving base station eNB 1 and neighboring base station eNB 2. Mobile terminal UE 1 of the serving cell receives a serving resource block from serving base station eNB 1 by using the same temporal frequency resource, and (as shown with a dashed line in the figure) receives an interference resource block from neighboring base station eNB 2. The radio communication system shown in FIG. 18 further includes puncturing device 181 arranged in serving base station eNB 1 and set up device 182 arranged in neighboring based station eNB 2. The recitation of serving base station eNB 1 and neighboring base station eNB 2 is merely relative. In mobile terminal UE 2, eNB 2 is the serving base station and eNB 1 is the neighboring base station, and thus, set up device 182 and puncturing device 181 may be placed in base stations eNB 1 and eNB 2, respectively. In base stations eNB 1 and eNB 2, other than set up device 182 and puncturing device 181, for example, a plurality of other means such as a control device capable of controlling the operation of set up device 182 and puncturing device 181 are further included. These other means may suffice to have the same structure as those of the base station device in the conventional technology, and thus, the detailed description thereof is omitted.

According to one embodiment of the present disclosure, set up device 182 of base station eNB 2 sets up the user-specific reference signal in the resource block (interference resource block as viewed from UE 1) to be transmitted to mobile terminal UE 2, and the user-specific reference signal may suffice to be the demodulation reference signal in the resource block or to be the above-described power sensing reference signal designed solely. Through the communication (in any form that can be realized by a person skilled in the art) between base stations eNB 1 and eNB 2, base station eNB 1 acquires the temporal frequency position of the user-specific reference signal which is set up in the interference resource block by base station eNB 2, puncturing device 181 in base station eNB 1 performs puncturing at the same temporal frequency position as the temporal frequency position at which the user-specific reference signal is set up on the interference resource block, in the serving resource block including the same temporal frequency resource as the interference resource block, transmitted to mobile terminal UE 1 by serving base station eNB 1 so as to prevent any signal from being transmitted at the punctured temporal frequency position.

Mobile terminal UE 1 receives the serving resource block and the interference resource block by the same temporal frequency resource, and thereafter, measures the power of the set up user-specific reference signal at the punctured temporal frequency position, as the interference power received from base station eNB 2 of the neighboring cell. If the measured interference power from base station eNB 2 of the neighboring cell exceeds a predetermined threshold value (that can be set up according to a system requirement), then mobile terminal UE 1 reports to base station eNB 1 of the serving cell, i.e., reports the measured interference power to base station eNB 1 of the serving cell. If the power does not exceed it, mobile terminal UE 1 does not report the measured interference power to base station eNB 1 of the serving cell.

As mentioned above, when the cell where base station eNB 2 exists is considered as the serving cell and the cell where base station eNB 1 exists is considered as the neighboring cell, in mobile terminal UE 2 in the serving cell, the set up device arranged in base station eNB 1 and puncturing device arranged in base station eNB 2 operate according to the above methods. These are not described here again.

Also, the number of the neighboring cells is not limited to one; an arbitrary number may suffice as long as possible to exist in the system.

Figure 19:
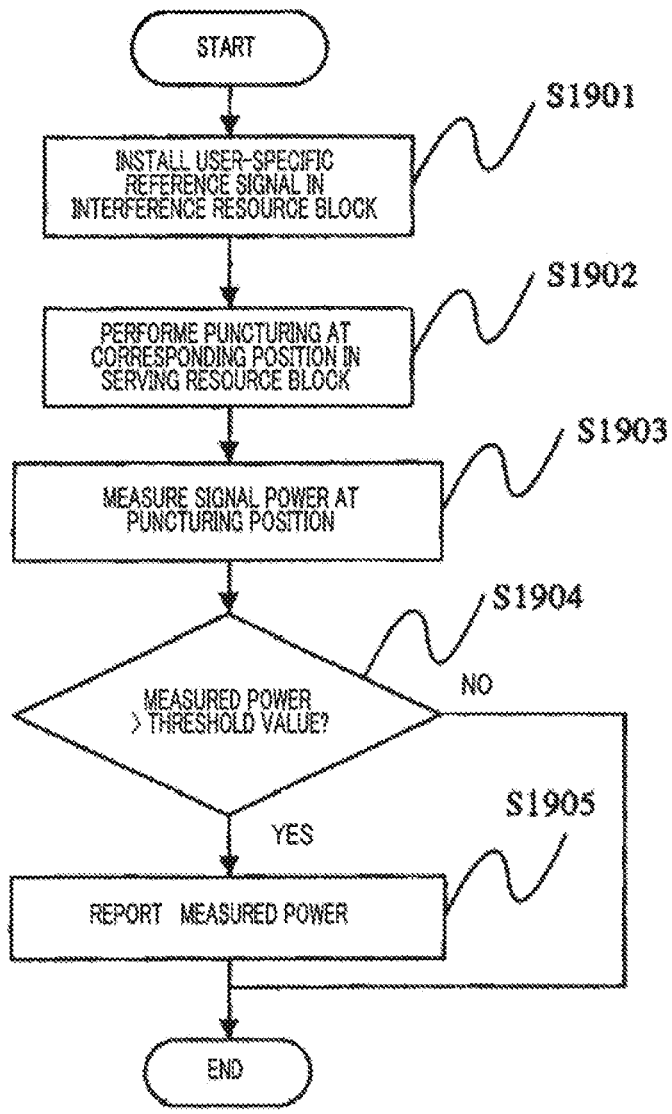
FIG. 19 is a flow chart illustrating a method of realizing the embodiment of the present disclosure.

FIG. 19 is a flow chart of a method of realizing the embodiment of this disclosure.

In step S1901 of the flow chart shown in FIG. 19, the user-specific reference signal is set up in the interference resource block of the neighboring cell. In step S1902 shown in FIG. 19, puncturing is performed at the same temporal frequency position as the temporal frequency position at which the user-specific reference signal is set up on the interference resource block, in the serving resource block of the serving cell so as to prevent any signal from being transmitted at the punctured temporal frequency position. In step S1903, at the punctured temporal frequency position, the power of the user-specific reference signal is measured as the interference power received from the neighboring cell. In step S1904, it is determined whether the measured interference power is greater than a predetermined threshold value. When the measured interference power from the neighboring cell exceeds a predetermined threshold value, the process proceeds to step S1905, and in step S1905, the interference power is reported to the serving cell.

The above-described process in step S1901 is realized by, for example, set up device 182 arranged in base station eNB 2 of the neighboring cell, the process in step S1902 is realized by, for example, puncturing device 181 arranged in base station eNB 1 of the serving cell, and the processes in steps S1903, S1904, and S1905 are realized by mobile terminal UE 1 of the serving cell eNB 1.

This method according to the embodiment of the present disclosure may further include a step of setting up the user-specific reference signal in one layer of the multilayered interference resource block so that any signal is prevented from being transmitted by performing the puncturing at the same temporal frequency position as the user-specific reference signal in the interference resource block of a layer other than this one layer. The method according to the embodiment of the present disclosure may further include a step of setting up the user-specific reference signal as the demodulation reference signal in the interference resource block. The method according to the embodiment of the present disclosure may further include a step of setting up the user-specific reference signal as a new demodulation reference signal other than demodulation reference signal specific in the interference resource block. The method according to the embodiment of the present disclosure may further include a step of setting up a beampattern of the power sensing reference signal as the sum of the beampatternss of all the signals in the interference resource block. The method according to the embodiment of the present disclosure may further include a step of setting up the power sensing reference signal at the temporal frequency position of the data signal in the interference resource block. The method according to the embodiment of the present disclosure may further include a step of setting up the power sensing reference signal at the temporal frequency position of the demodulation reference signal in the interference resource block. The method according to the embodiment of the present disclosure may further include a step of setting up the demodulation reference signal of which the position is occupied at another temporal frequency position. The method according to the embodiment of the present disclosure may further include a step of setting up the power sensing reference signal at the temporal frequency position of the channel status information reference signal in the interference resource block. The method according to the embodiment of the present disclosure may further include a step of setting up the position of the power sensing reference signal in the control zone of the interference resource block. The method according to the embodiment of the present disclosure may further include a step of separating the temporal frequency positions of the power sensing reference signal and the Rel-8 RS reference signal in the interference resource block from each other. The method according to the embodiment of the present disclosure may further include a step of searching a precoding vector database in the base station of the neighboring cell so as to find a precoding vector which most closely matches the entire beampattern of a signal of each layer of the interference resource block so that the resultant vector is regarded as the precoding vector of the power sensing reference signal. The method according to the embodiment of the present disclosure may further include a step of setting up the precoding vector of the signal of each layer based on a codebook and storing beforehand the precoding vector corresponding to the power sensing reference signal. The method according to the embodiment of the present disclosure may further include a step in which the beampatterns of the signal of each layer in the interference resource block are calculated, and the beampatterns of each layer are overlapped so as to consider the overlapped charts as the beampattern of the power sensing reference signal, and thereafter, spectral decomposition is performed based on the beampattern of the power sensing reference signal so as to acquire the precoding vector of the power sensing reference signal. The method according to the embodiment of the present disclosure may further include a step of setting up the power sensing reference signals at predetermined temporal frequency intervals, in a plurality of interference resource blocks where temporal frequencies continue. Each of the above-described steps may be realized by, for example, set up device 182 arranged in base station eNB 2 of the neighboring cell.

According to the adaptive feedback system of the embodiment of the present disclosure, uplink feedback overheads can be effectively reduced. For example, assuming that each UE is a single reception antenna and two base stations are each four transmission antennas, then the antenna spacing ensures that fading between the antennas is an independent fading. It is assumed that all the channel information exists on the base station side and the transmission is a maximum ratio transmission. In this case, the fact that the adaptive feedback system can reduce feedback overhead as shown in the following table is derived from one simple simulation.

TABLE 1

| Adaptive-type feedback can effectively reduce feedback overhead. | | |
|---|---|---|
| | If signal to noise ratio is SIR > 6 dB, do not report | If signal to noise ratio is SIR > 10 dB, do not report |
| 4Tx | 41% | 56% |
| 8Tx | 17% | 47% |

It is obvious to a person skilled in the art that a method of measuring the interference power of the neighboring cell can not only be used to reduce feedback overhead of the coordinated beamforming but also be applied to another communication system to improve the performance of another system or to reduce another overhead.

Each of the embodiments in the subject application is merely described as exemplary, the specific configuration and operation of each of the embodiments do not intend to limit the scope of the present disclosure, a person skilled in the art can generate a new mode of embodiment by combining a different part or operation in each of the embodiments, and similarly, such a possibility matches the idea of the present disclosure.

The embodiment of the present disclosure may be realized by hardware, software, firmware, and combination of these methods; however, the realization method shall not limit the scope of the present disclosure.

The mutual connection relationship between each functional element (means) in the embodiment of the present disclosure does not limit the scope of the present disclosure; one or more of these elements may include some functional element or may be connected to some functional element.

Above, some embodiments of the present disclosure are shown and explained in combination with drawings, but, without departing from the principles and spirit of the present disclosure, this embodiment can be changed or modified and still they are within the scope of claims of the present disclosure and the scope of their equivalents is obvious to the skilled persons.

The invention claimed is:

1. A communication apparatus comprising:
   a receiver which, in operation, receives a reference signal mapped to at least one first resource element in an interference resource block of a neighboring cell and receives no signal on at least one second resource element in a serving resource block of a serving cell, wherein the at least one first resource element and the at least one second resource element share a common time-frequency;
   power estimating circuitry which, in operation, estimates interference transmission power by using the received reference signal; and
   a transmitter which, in operation, transmits interference information to a base station apparatus in the serving cell.

2. The communication apparatus according to claim 1, wherein the interference information is information on the interference transmission power from the neighboring cell to the serving cell.

3. The communication apparatus according to claim 1, wherein the serving cell performs a coordinated transmission with the neighboring cell.

4. The communication apparatus according to claim 1, wherein the serving cell performs a coordinated beamforming with the neighboring cell.

5. The communication apparatus according to claim 1, wherein the reference signal is used for measuring channel information.

6. The communication apparatus according to claim 5, wherein the channel information is at least one of channel state information (CSI) and precoding matrix index (PMI).

7. The communication apparatus according to claim 1, wherein the power estimating circuitry, in operation, obtains channel information, which is measured based on the reference signal.

8. The communication apparatus according to claim 1, wherein the reference signal is a demodulation reference signal.

9. The communication apparatus according to claim 1, wherein the reference signal is a power sensing reference signal.

10. A communication method comprising:
    receiving a reference signal mapped to at least one first resource element in an interference resource block of a neighboring cell and receiving no signal on at least one second resource element in a serving resource block of a serving cell, wherein the at least one first resource element and the at least one second resource element share a common time-frequency;
    estimating interference transmission power by using the received reference signal; and
    transmitting interference information to a base station apparatus in the serving cell.

11. The communication method according to claim 10, wherein the interference information is information on the interference transmission power from the neighboring cell to the serving cell.

12. The communication method according to claim 10, wherein the serving cell performs a coordinated transmission with the neighboring cell.

13. The communication method according to claim 10, wherein the serving cell performs a coordinated beamforming with the neighboring cell.

14. The communication method according to claim 10, wherein the reference signal is used for measuring channel information.

15. The communication method according to claim 14, wherein the channel information is at least one of channel state information (CSI) and precoding matrix index (PMI).

16. The communication method according to claim 10, further comprising obtaining channel information, which is measured based on the reference signal.

17. The communication method according to claim 10, wherein the reference signal is a demodulation reference signal.

18. The communication method according to claim 10, wherein the reference signal is a power sensing reference signal.

* * * * *